United States Patent
Kikuchi

(10) Patent No.: US 8,023,213 B2
(45) Date of Patent: Sep. 20, 2011

(54) PATTERNED MEDIUM INSPECTION METHOD AND INSPECTION DEVICE

(75) Inventor: Hiroto Kikuchi, Nagano (JP)

(73) Assignee: Fuji Electric Device Technology Co., Ltd, Tokyo (JP)

(*) Notice: Subject to any disclaimer, the term of this patent is extended or adjusted under 35 U.S.C. 154(b) by 212 days.

(21) Appl. No.: 12/382,830

(22) Filed: Mar. 24, 2009

(65) Prior Publication Data

US 2009/0251816 A1    Oct. 8, 2009

(30) Foreign Application Priority Data

Mar. 25, 2008  (JP) ................................ 2008-078768
Dec. 19, 2008  (JP) ................................ 2008-323667

(51) Int. Cl.
*G11B 27/36* (2006.01)
(52) U.S. Cl. ......................................................... 360/31
(58) Field of Classification Search ........................ None
See application file for complete search history.

(56) References Cited

U.S. PATENT DOCUMENTS

| | | | | |
|---|---|---|---|---|
| 5,612,845 | A * | 3/1997 | Smith | 360/137 |
| 6,014,296 | A | 1/2000 | Ichihara et al. | |
| 7,425,821 | B2 * | 9/2008 | Monreal et al. | 324/117 H |
| 2007/0273997 | A1 * | 11/2007 | Olson | 360/69 |

FOREIGN PATENT DOCUMENTS

| | | |
|---|---|---|
| JP | 09-097419 | 4/1997 |
| JP | 2001-034902 | 2/2001 |
| JP | 2002-015420 | 1/2002 |
| JP | 2004-199733 | 7/2004 |

OTHER PUBLICATIONS

Kurihara et al., "An Application of CITI Code to Perpendicular Magnetic Recording" Bulletin of Niihama National College of Technology, vol. 41, pp. 51-58, 2005.

* cited by examiner

*Primary Examiner* — Daniell L Negron
*Assistant Examiner* — Regina N Holder
(74) *Attorney, Agent, or Firm* — Rabin & Berdo, P.C.

(57) ABSTRACT

A defect inspection method and device for a perpendicular magnetic recording medium that has discrete recording tracks and grooves between recording tracks, including DC demagnetizing the perpendicular magnetic recording medium, detecting a reproduced signal from the perpendicular magnetic recording medium after the DC demagnetizing, removing output fluctuation components caused by the grooves from the reproduced signal using a filter with a prescribed cutoff frequency and separating a peak output of the reproduced signal, comparing the peak output with a prescribed reference signal, and identifying a location where the peak output exceeds the reference signal as a defect location. The method further includes performing an envelope-detection on the reproduced signal, detecting a pre-format region in the perpendicular magnetic recording medium using the envelope-detection result, masking the detected pre-format region, and detecting the defect location in a region outside the masked pre-format region in the perpendicular magnetic recording medium.

16 Claims, 30 Drawing Sheets ns
PATTERNED MEDIUM INSPECTION METHOD AND INSPECTION DEVICE

BACKGROUND OF THE INVENTION

1. Field of the Invention

This invention relates to a defect inspection method and to a defect inspection device for a magnetic recording medium.

2. Description of the Related Art

In recent years, hard disk drives have tended toward larger capacities, and recording densities of a magnetic recording medium have continued to rise. Conventional longitudinal recording methods are methods in which magnetization is parallel to a medium in-plane direction; in a magnetic recording medium employing this method, when recording densities are high magnetization reversals due to thermal fluctuations exert a considerable influence, so that a limit to high recording densities had been approached. On the other hand, in perpendicular magnetic recording methods, in which the magnetization is perpendicular to the medium plane, as recording densities are raised the demagnetizing field within the recording magnetization tends to stabilize the magnetization, and thermal fluctuations due to the demagnetizing field do not readily occur. Hence in recent years a perpendicular magnetic recording medium has been considered for application in high-density recording.

However, increases in track density accompanying higher recording densities result in the problem of interference with adjacent tracks. Hence a discrete-track type magnetic recording medium has been proposed, in which grooves are provided between recording tracks of the magnetic recording medium. In a discrete-track type magnetic recording medium, intervals between tracks are filled with a nonmagnetic material, so that interference between tracks can be reduced (for example, see Japanese Patent Application Laid-open No. H9-97419).

Further, in a recording medium known as a bit patterned medium, in addition to providing grooves between tracks, recording elements corresponding to single bits can be made independent by also providing grooves between bits. Thus, interference between adjacent tracks as well as interference between adjacent bits can be reduced. A recording medium having such patterns in the medium surface are called a patterned medium (and will hereafter be called a patterned medium); in addition to grooves demarcating tracks or bits, servo data used in positioning control in a hard disk device is also provided as a pattern on the medium surface. The patterned medium also includes a medium in which only a servo pattern is provided on the medium surface.

A hard disk device causes a head to be lifted at approximately 10 nm above a hard disk, and performs data recording and reproduction. If there is a defect in the surface of the hard disk, then serious problems such as head flight fluctuations and head damage may occur. Hence it is necessary to perform tests to determine whether a magnetic disk satisfies performance conditions deemed the minimum necessary prior to incorporation in a hard disk drive (HDD). Such tests are generally performed using a test head, to inspect the magnetic disk glide characteristics and certification characteristics. In glide characteristic inspections, the number of protrusions on the magnetic disk are determined. In certification characteristic inspections, the presence or absence of electric characteristics and defects of the magnetic disk is confirmed. In the test of certification characteristics, specific signals are recorded on the magnetic recording medium, and the level of the reproduced signals is compared with a reference signal level to inspect for the presence of defects in the magnetic disk.

For example, as a perpendicular magnetic recording medium defect inspection method, a dropout detection method, in which output fluctuations in the reproduced signals from a perpendicular magnetic recording medium which has been DC-demagnetized in advance are compared with a reference signal, is known (see for example Japanese Patent Application Laid-open No. 2004-199733).

However, in methods of the prior art, certification characteristic inspections of magnetic disks using discrete track designs must be performed with a servomechanism applied. This is because, as shown in FIG. 1A, the situation is satisfactory when the inspection head 11 is positioned above a track 13, but when the inspection head 11 traverses a groove 12 under the influence of eccentricity, as in FIG. 1B. (that is, when the inspection head 11 deviates from the track 13), it is substantially impossible to reproduce signals.

On the other hand, in defect inspections of an ordinary (grooveless) magnetic disk medium, no servomechanism is applied, and so defect inspection devices used in current mass production processes often do not have servo functions. Hence in order to perform inspections with a servomechanism applied, tasks must be performed to improve the stage portion which moves the head to a VCM (Voice Coil Motor) similar to that used in hard disk devices.

A method has been disclosed in which a magnetic head is used having a broad width compared with the width of tracks on the magnetic disk to inspect the magnetic disk, and performing defect inspections using signals obtained by cutting out the low-frequency components of reproduced signals with a filter (see for example Japanese Patent Application Laid-open No. 2002-15420).

In certification inspections of so-called a discrete track medium and patterned medium, having patterns in the medium surface corresponding to servo data and other preformat information, the servo region and other preformat regions must be masked to perform defect inspections in data regions.

Normally, servo signals include preamble signals used to generate a servo clock, SAM (Servo Address Mark) signals indicating a servo region, address signals indicating the track number and sector number, and burst signals used in precise positioning. In addition, signal-free regions are provided between servo regions and data regions. To detect servo signals in a patterned medium, first a signal-free region is detected, and then a servo clock is generated in synchronization with the preamble signal, and the servo clock thus generated is used to detect the signal that follows. If the detect signal matches a SAM signal, then the region is identified as a servo region, and the address signal following the SAM signal is detected. Thereafter the burst signal is detected.

To detect servo regions, this servo demodulation must be performed, and a device which performs certification inspection must include a servo data demodulator. However, servo data generally differs among products, and it is difficult to incorporate a servo data demodulator that supports different products.

SUMMARY OF THE INVENTION

A defect inspection method for a perpendicular magnetic recording medium that has discrete recording tracks and grooves between recording tracks, including DC demagnetizing the perpendicular magnetic recording medium, detecting a reproduced signal from the perpendicular magnetic recording medium after the DC demagnetizing, removing output fluctuation components caused by the grooves from the reproduced signal using a filter with a prescribed cutoff frequency and separating a peak output of the reproduced signal, comparing the peak output with a prescribed reference signal, and identifying a location where the peak output exceeds the reference signal as a defect location.

The method and device further includes performing an envelope detection on the reproduced signal, detecting a pre-format region in the perpendicular magnetic recording medium using the result of the envelope detection, masking the detected pre-format region, and detecting the defect location in a region outside the masked pre-format region in the perpendicular magnetic recording medium.

DESCRIPTION OF THE PREFERRED EMBODIMENTS

Figure 1A:
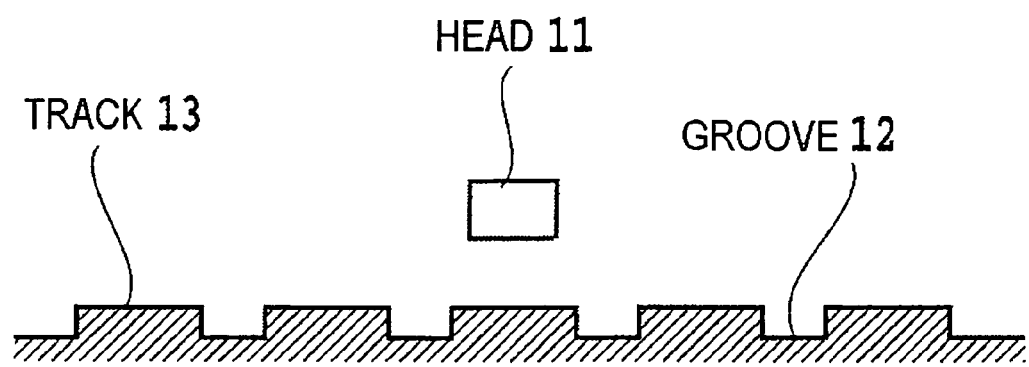
FIGS. 1A and 1B show the positional relationship of an inspection head and a magnetic disk.
Figure 1B:
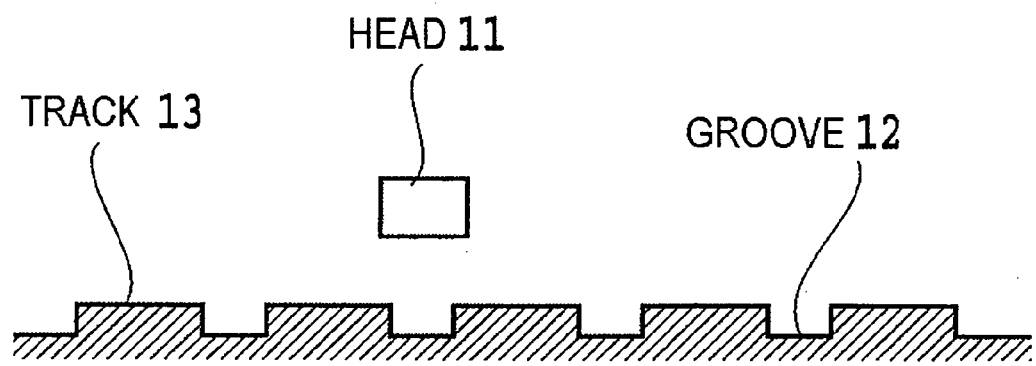

Below, aspects of the invention are explained referring to the drawings. In the plurality of drawings, the same symbols represent the same portions, and repeated explanations are omitted.

Figure 2:
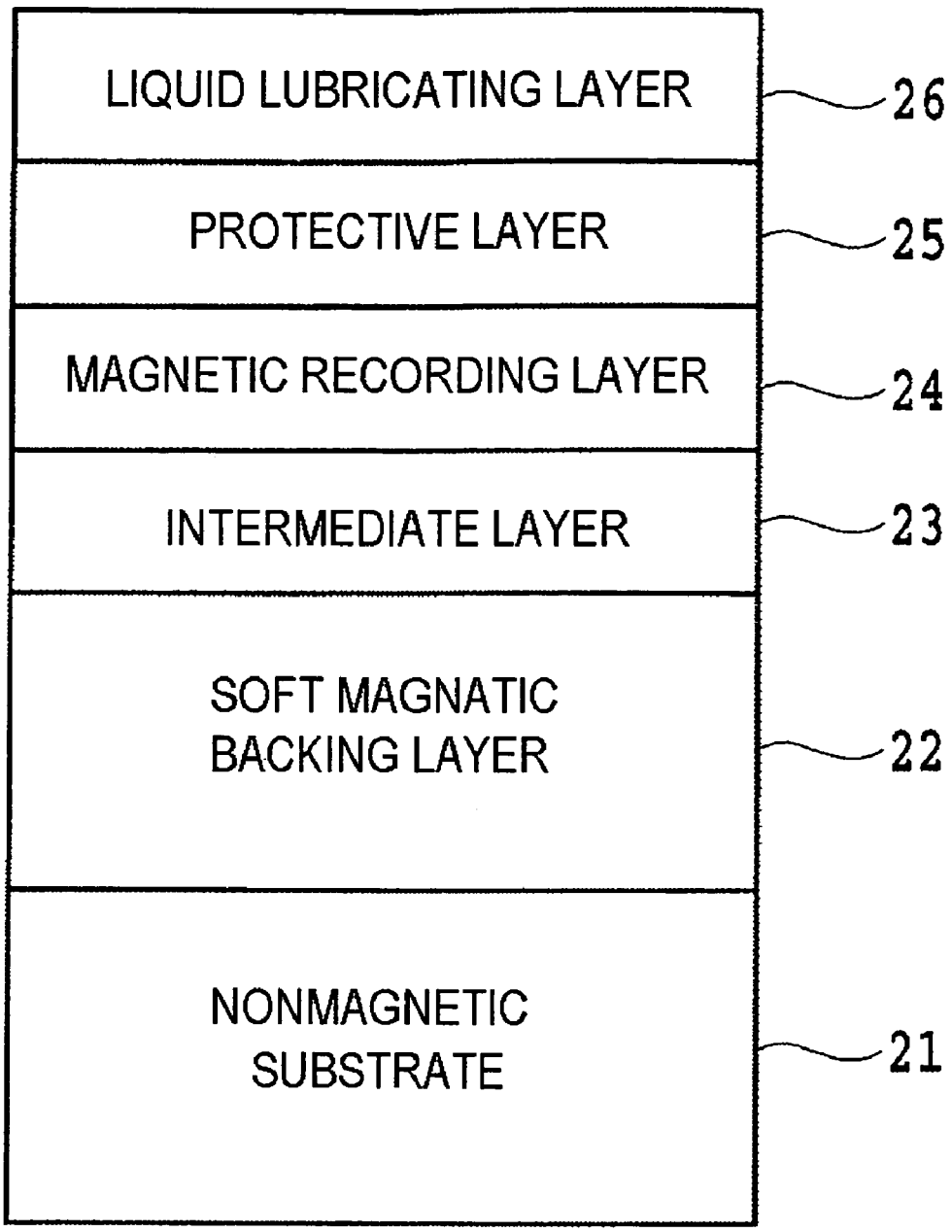
FIG. 2 shows the configuration of a general perpendicular magnetic recording medium.

FIG. 2 shows the configuration of a general perpendicular magnetic recording medium. As shown in the figure, a general perpendicular magnetic recording medium is formed by layering, in order, a soft magnetic backing layer 22, an intermediate layer 23, a magnetic recording layer 24, and a protective layer 25 on a nonmagnetic substrate 21. A liquid lubricating layer 26 is applied on the protective layer 25.

Figure 3:
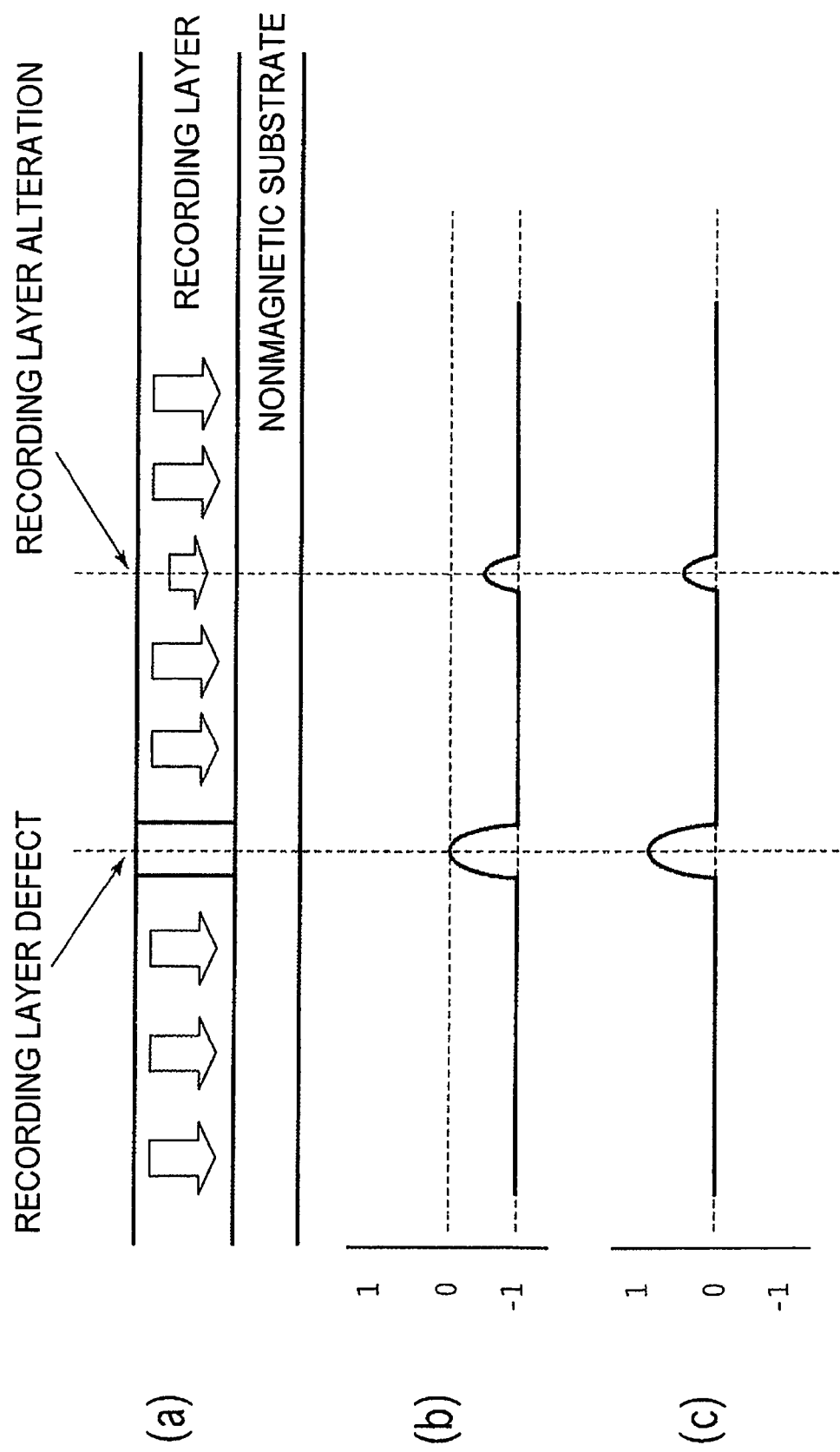
FIG. 3 is a diagram used to explain the principle of a defect inspection method of this invention for a perpendicular magnetic recording medium.

FIG. 3 explains the principle of a defect inspection method of a perpendicular magnetic recording medium of the invention. FIG. 3(a) schematically shows a magnetization state after DC demagnetization of the recording layer on the nonmagnetic substrate. The direction of the arrows indicates the direction of magnetization, and the lengths of the arrows represent the magnetization intensity. For example, in columns in which the magnetic layer is altered, the arrow is short (that is, the magnetization intensity is weak). In a column in which the recording layer is missing, no arrow is shown. FIG. 3(b) and FIG. 3(c) show output waveforms from a reproducing element in a magnetic head.

Figure 4:
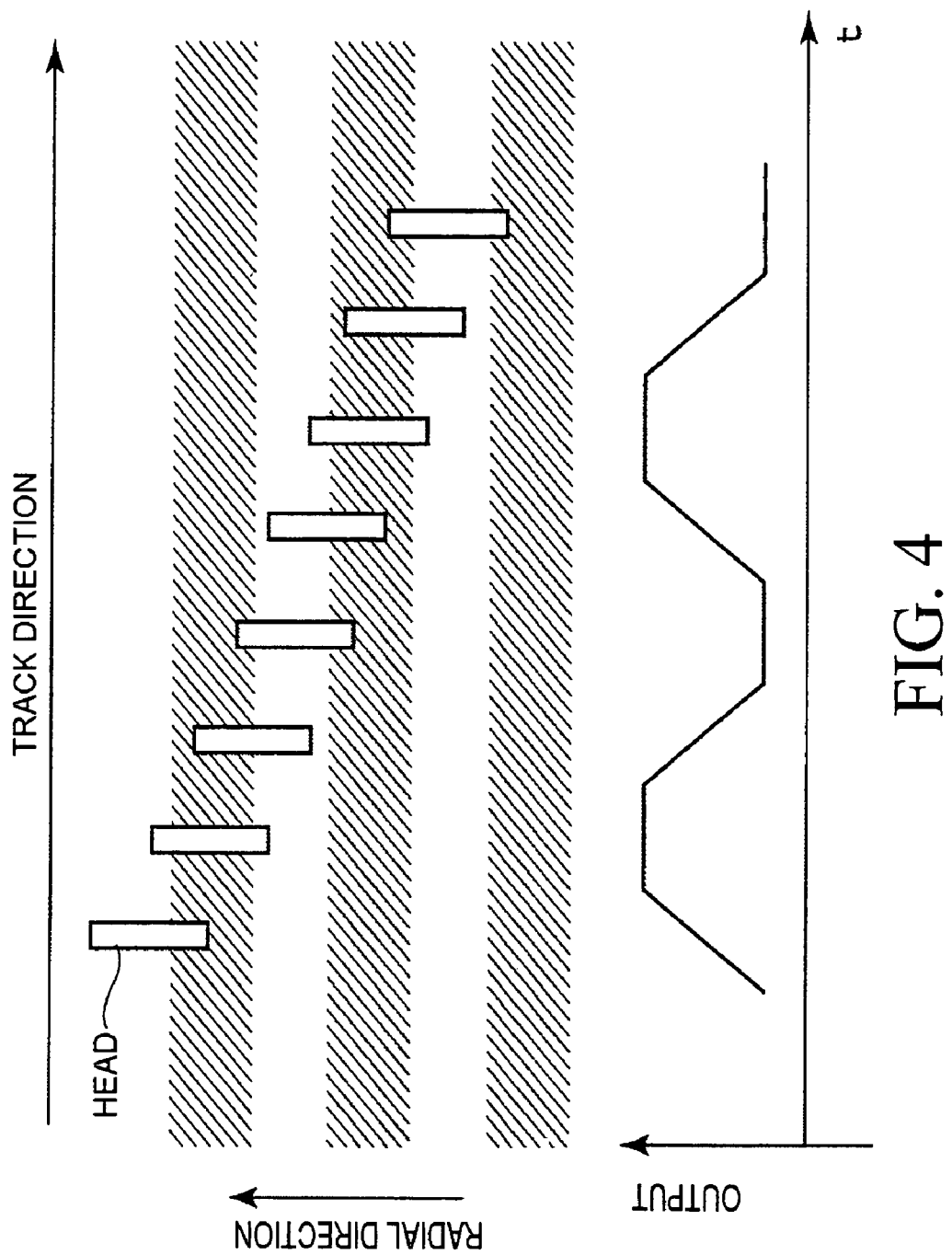
FIG. 4 shows the relation between track deviation due to eccentricity and reproduced signal output waveform.

FIG. 4 shows the relationship between track deviation due to eccentricity and reproduced signal output waveforms.

In a defect inspection method of one aspect of the invention, first, an electromagnet or a permanent magnet is used to DC demagnetize the entire surface in a single operation, or a magnetic head is used to DC demagnetize a track for inspection, of a disk of a perpendicular magnetic recording medium such as that shown in FIG. 2. Next, the reproduced signal from the reproduction element (MR element) in the magnetic head is detected. In a perpendicular magnetic recording medium, the magnetization direction is perpendicular to the medium plane, so that when DC demagnetization is performed, the magnetization direction is as shown in FIG. 3(a). As a result, the output from the MR element is constant on the +side or on the −side in the magnetization direction. For example, when, as shown in FIG. 3(a), there is a defect or an alteration in the recording layer, the defect location is not magnetized, or the magnetization intensity at the alteration location is weakened. As a result, as shown in FIG. 3(b), a peak is detected in the output from the MR element due to the absence of magnetization or due to the weakness of the magnetization intensity. In general, an MR element is connected to an amplifier by AC coupling, so that the DC component of the output from the MR element is eliminated, and a pulse-shape output (hereafter called an "extra pulse") such as shown in FIG. 3(c) results. This output is compared with a prescribed reference voltage, and locations at which the reference voltage is exceeded are detected as defect locations.

On the other hand, when DC demagnetization is performed as described above for a medium having discrete tracks, reproduced signals are on the +side or on the −side over data tracks, and the output declines when the magnetic head traverses groove portions due to eccentricity. As a result, the reproduced signal output waveform alternates periodically between output close to 0 and + side or − side output, as shown in FIG. 4. When track deviation due to eccentricity is regarded as sinusoidal, the fastest period at which the magnetic head traverses a track during one rotation of the disk is at 0 radians and π radians; when for example the eccentricity is 100 µm p-p, the disk rotation rate is 5400 rpm, the medium has discrete tracks with a track width of 30 nm and groove width of 30 nm, and the read element width is 45 nm, then the period of the periodic signals resulting from track traversals is at maximum approximately 470 Hz.

Figure 5A:
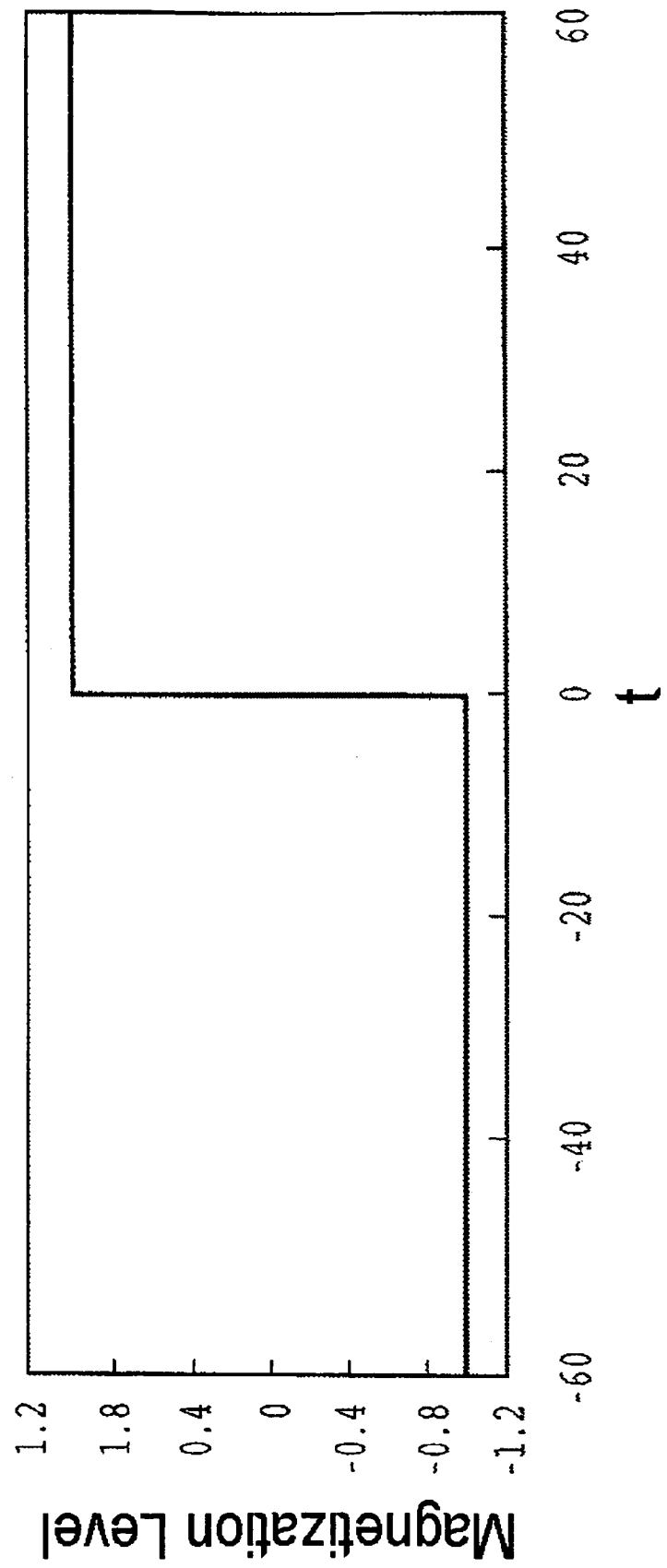
FIGS. 5A and 5B show a magnetization state and a reproduced signal waveform respectively.
Figure 5B:
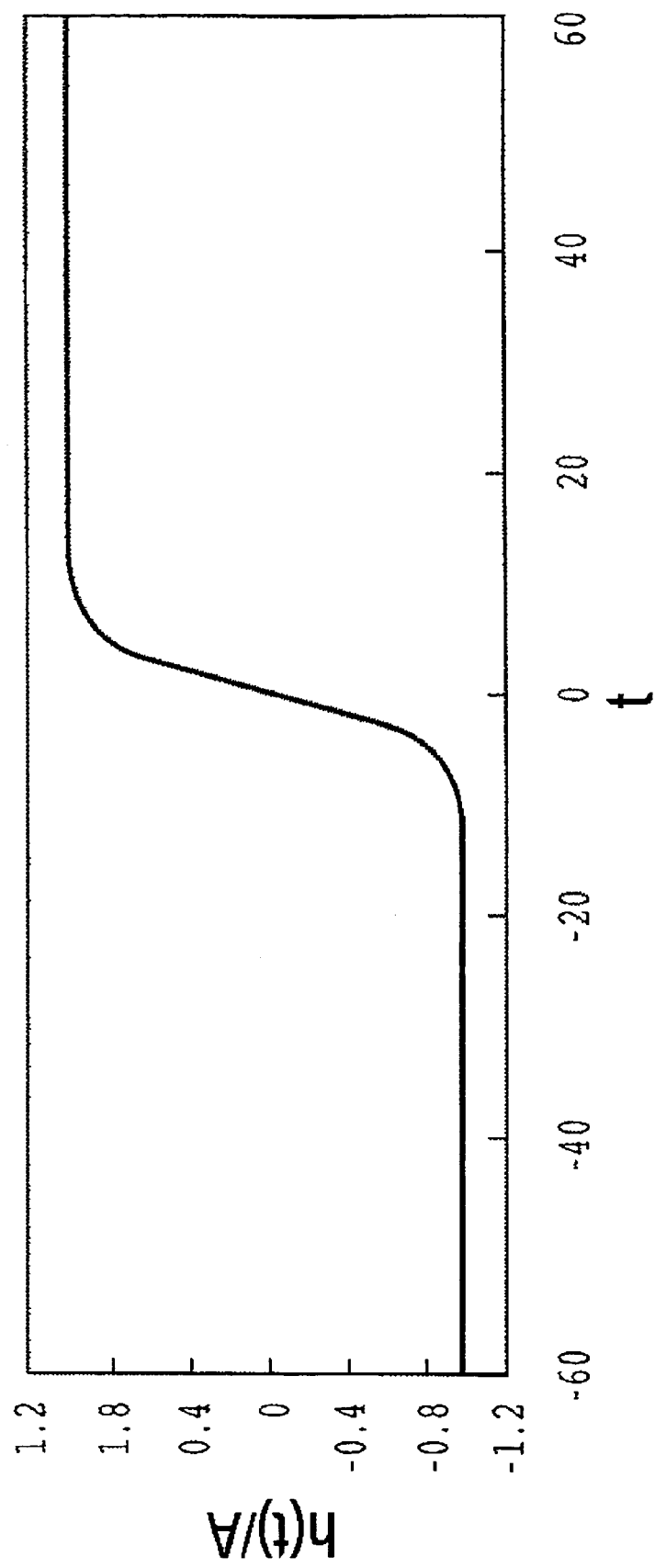

Here the spectrum of the above-described extra pulse is explained. If the magnetization state has a step shape as shown in FIG. 5A, then the waveform of reproduced signals reproduced by the magnetic head, shown in FIG. 5B, is expressed by the hyperbolic tangent function of equation (1) below (see for example *Bulletin of Niihama National College of Technology*, Vol. 41, pp. 51 to 58).

$$h(t) = A \tanh\left(\frac{\ln 3}{T_{50}} t\right) \quad (1)$$

Here A is the saturation level, and $T_{50}$ is the time required to change from $-A/2$ to $A/2$. When considering an extra pulse reproduced from a defect, the magnetization state has a pulse shape as shown in FIG. 6A, and by linear super-positioning, the extra pulse can be represented as in equation (2) below.

$$g(t) = \frac{1}{2}(h(t) - h(t - T_0)) \quad (2)$$

Figure 6A:
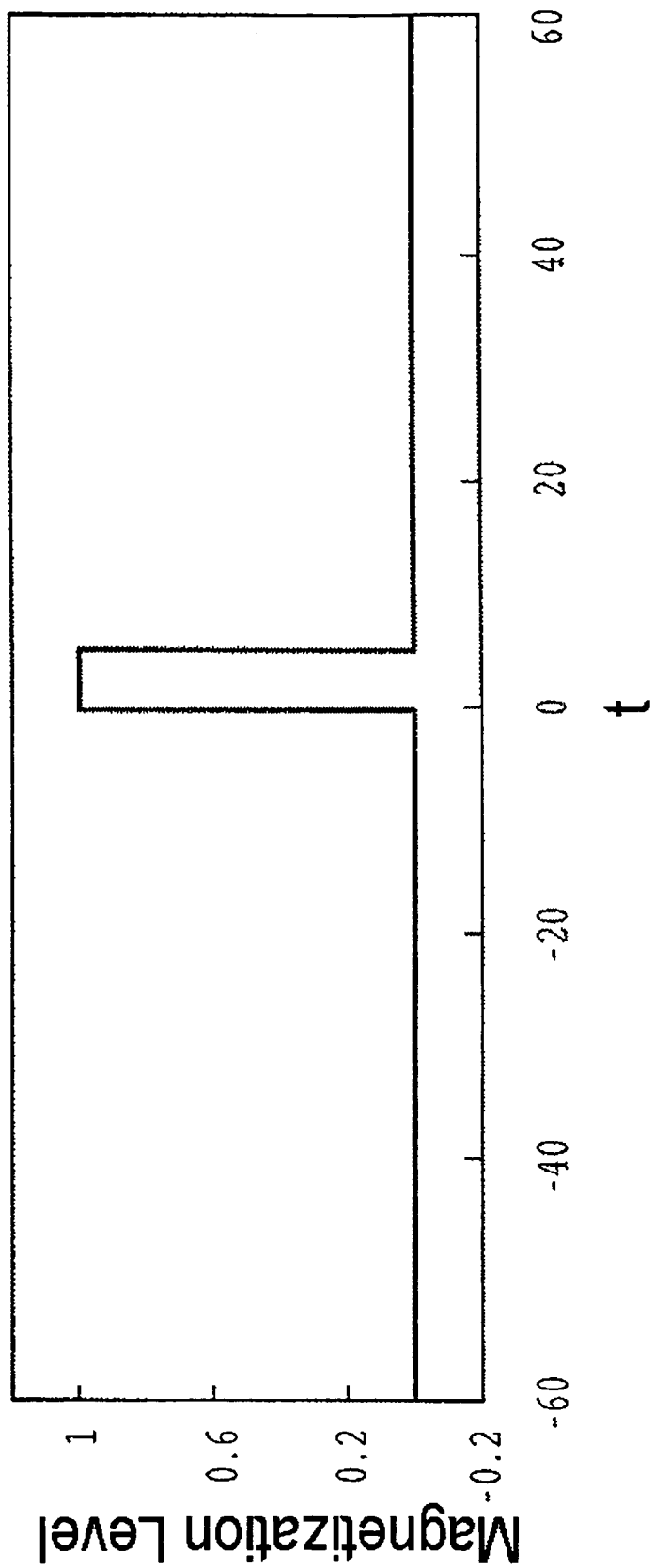
FIGS. 6A and 6B show a magnetization state and a reproduced signal waveform respectively.

Here, $T_0$ is the width of the pulse in FIG. 6A. In actuality it is the length of the defect.

Figure 6B:
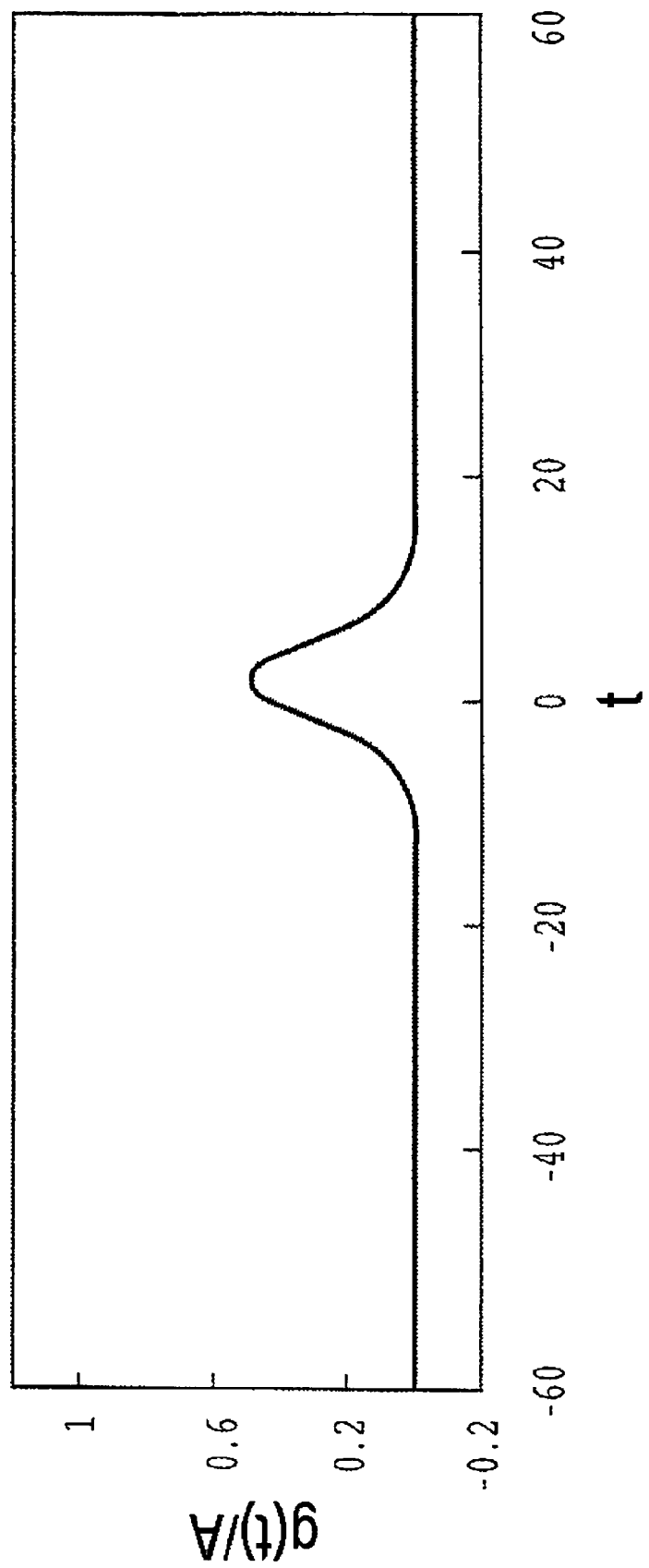

FIG. 6B shows the waveform represented by the above equation (2). Here $T_{50}$ is 4.54 nsec, and $T_0$ is 4.54 nsec. The rise time $T_r$ calculated using the above equation (1) for the condition $T_{50}$=4.54 nsec (the time required for the output h(t) to change from 10% to 90%, when the amplitude is 100%) is 9.2 nsec.

Figure 7:
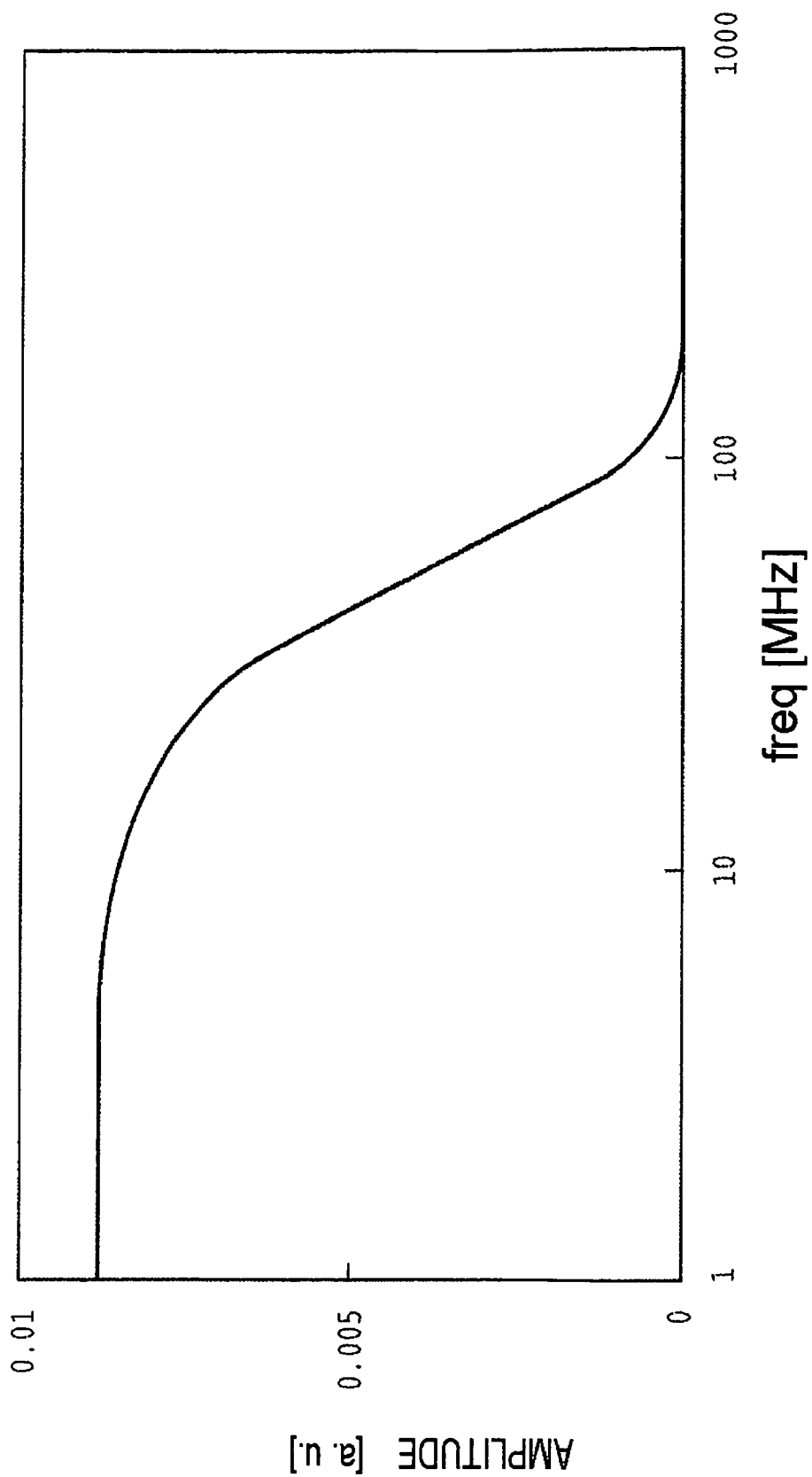
FIG. 7 shows the relation between frequency and amplitude.

When a FFT (Fast Fourier Transform) of these results is performed to examine the frequency components, FIG. 7 is obtained. As shown in FIG. 7, signal components exist in the frequency band equal to or below $1/T_r$ ($\leqq$108 MHz).

In this way, there is a large difference between the period of output fluctuations when the magnetic head traverses tracks due to the effect of eccentricity, and the upper limit to frequency components comprised by extra pulses resulting from defects. Hence by using a filter to separate these two components and detecting only extra pulses, certification characteristic inspections (that is, defect inspections) of a discrete track type perpendicular magnetic recording medium can be performed without applying a servomechanism.

First Embodiment

Figure 8:
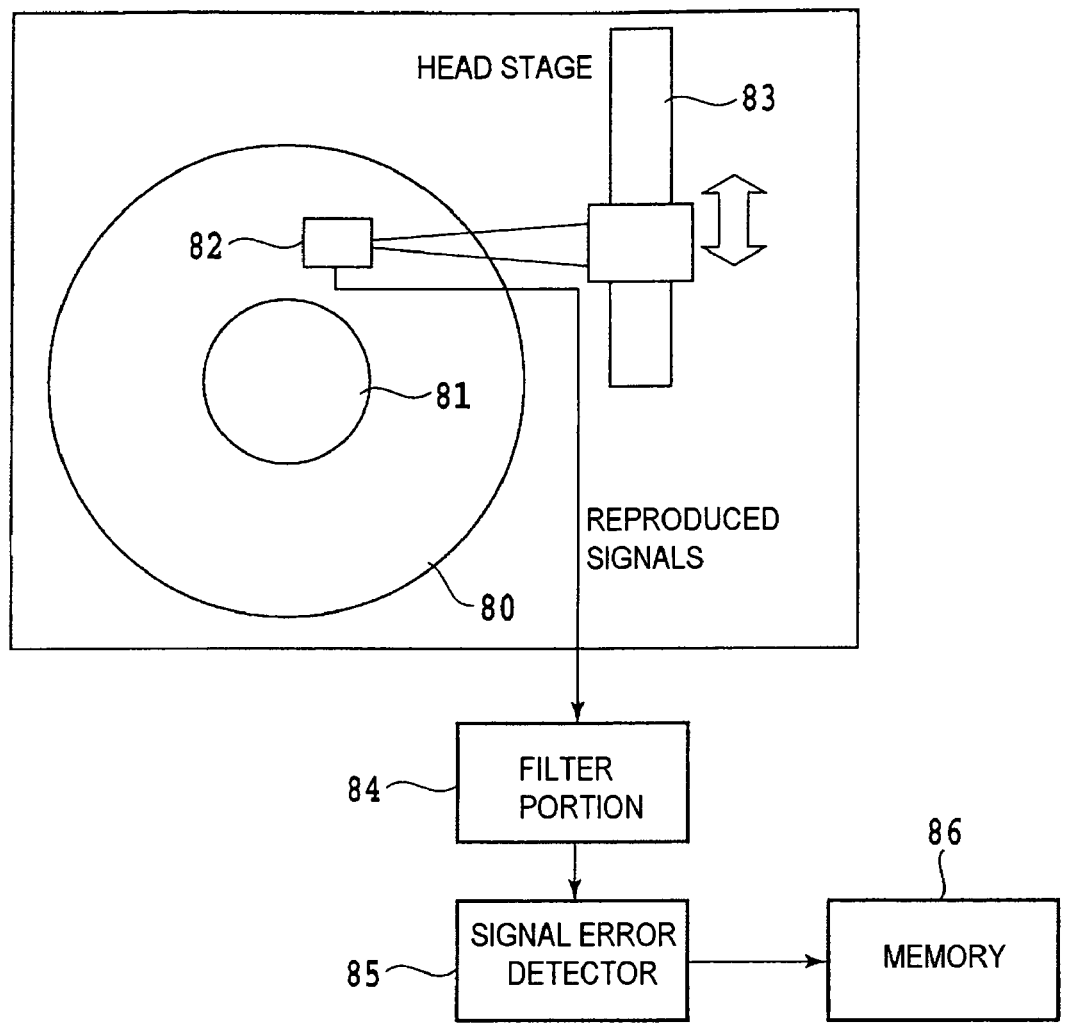
FIG. 8 shows the discrete track medium defect inspection device of an aspect of the invention.

FIG. 8 shows a discrete track medium defect inspection device of one embodiment of the invention. The defect inspection device of the embodiment of the invention comprises a spin stand 81, which rotates the disk 80 for inspection; a stage portion 83, which holds and moves a magnetic head 82 for use in inspection; a filter portion 84, which extracts only extra pulse components from reproduced signals; a signal error detector 85, which performs defect inspections of reproduced signals which have passed through the filter portion 84; and memory 86, which stores the results of the signal error detector 85. The filter portion 84 employs a high-pass filter or a band-pass filter.

Next, the flow of defect inspection using the above-described defect inspection device is explained. First, the entire surface of the disk for inspection is DC demagnetized in a single operation using an electromagnet or a permanent magnet. Next, the disk 80 is set on the spindle and is rotated, and the magnetic head 82 is caused to fly above the disk 80. Then, the magnetic head 82 is moved to the starting track for inspection, and inspection is performed. In inspection, reproduced signals which have passed through the filter portion 84 are compared with a reference signal. In the signal error detector 85, when output exceeding the reference signal is detected, it is judged that an extra pulse exists, and the result of error detection is stored in memory 86.

Figure 9:
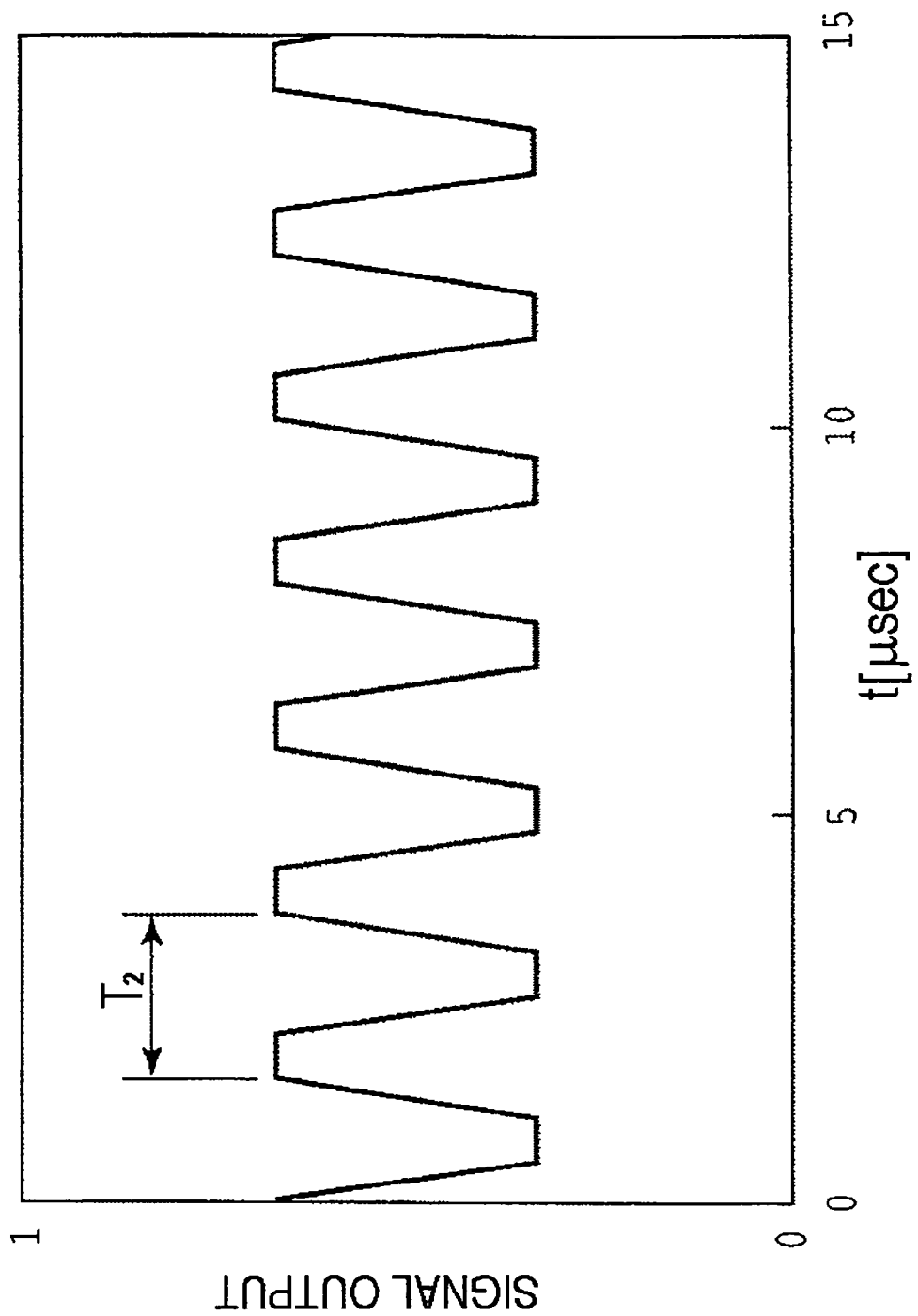
FIG. 9 shows the period of periodic signals due to track traversal.
Figure 10:
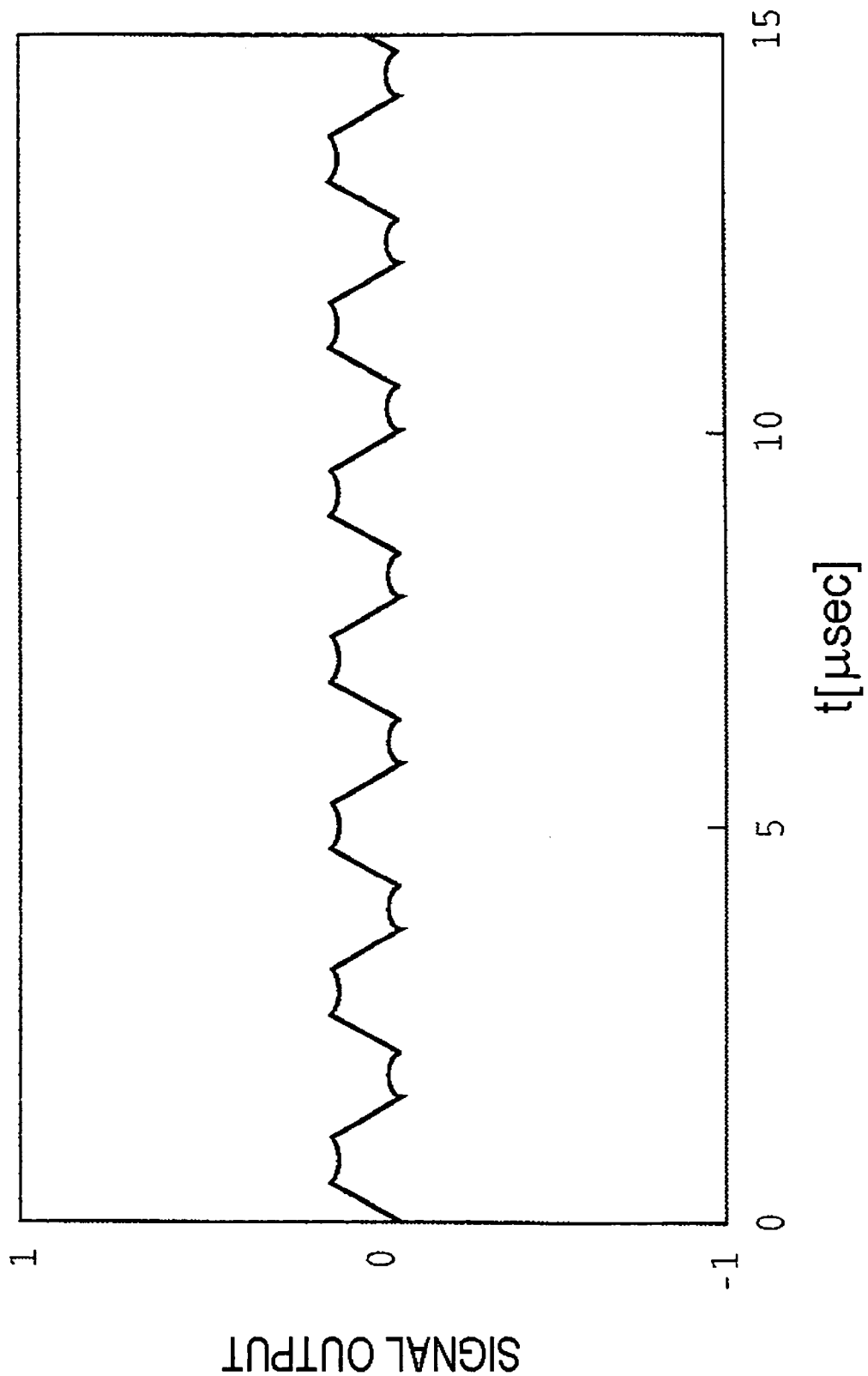
FIG. 10 shows the output waveform after filtering (cutoff frequency $F_c$=0.5 MHz)
Figure 11:
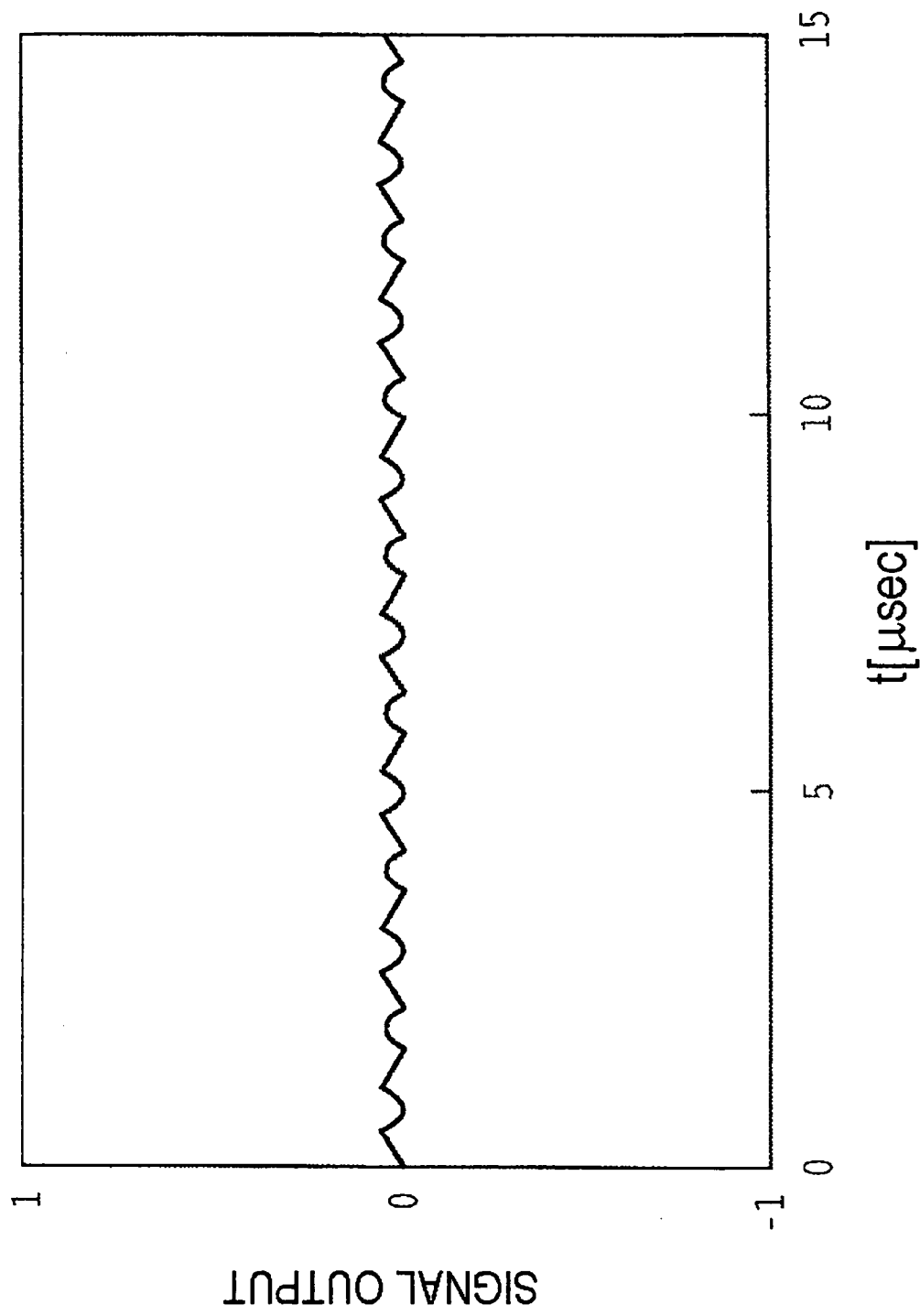
FIG. 11 shows the output waveform after filtering (cutoff frequency $F_c$=1 MHz)
Figure 12:
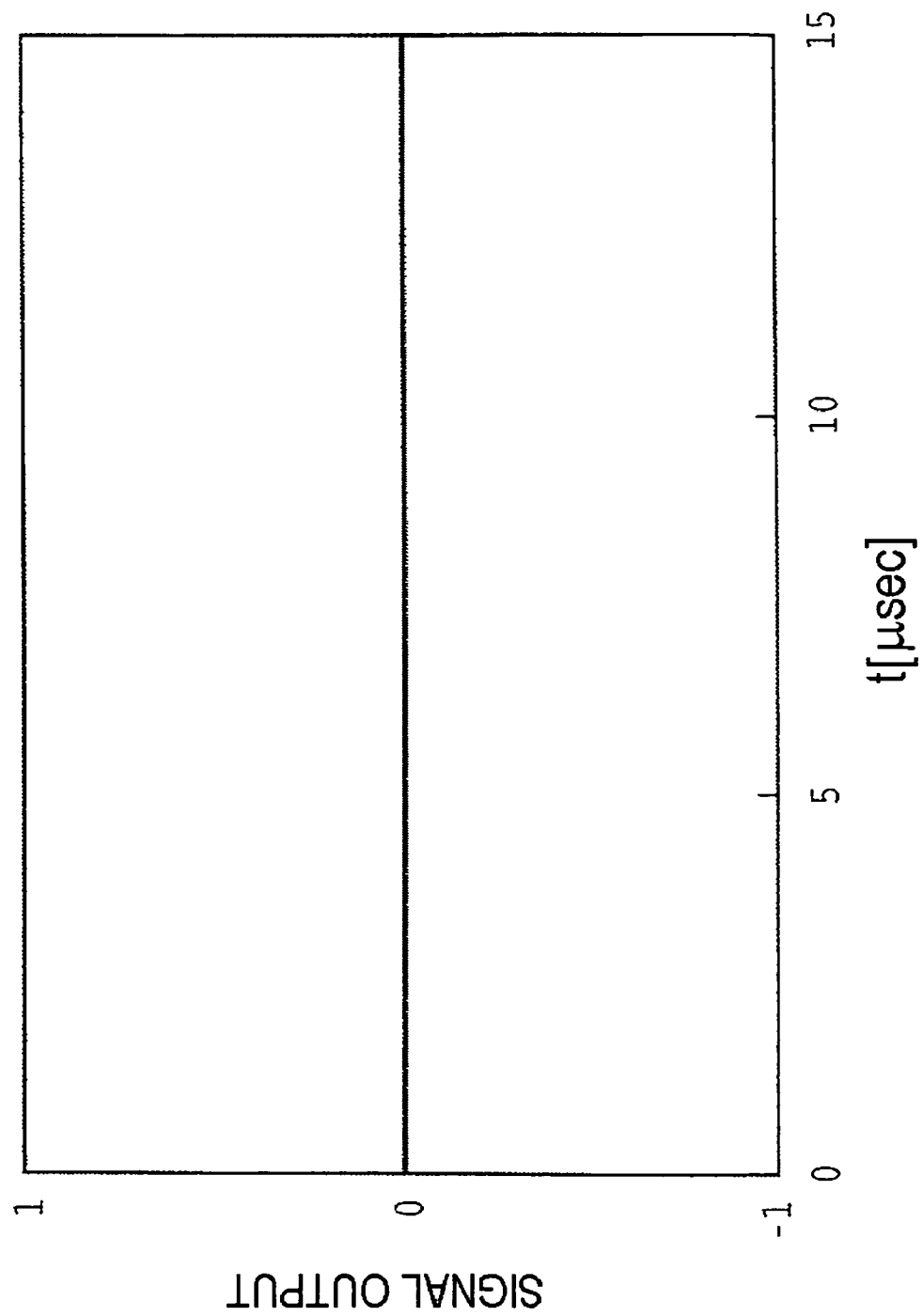
FIG. 12 shows the output waveform after filtering (cutoff frequency $F_c$=5 MHz)
Figure 13:
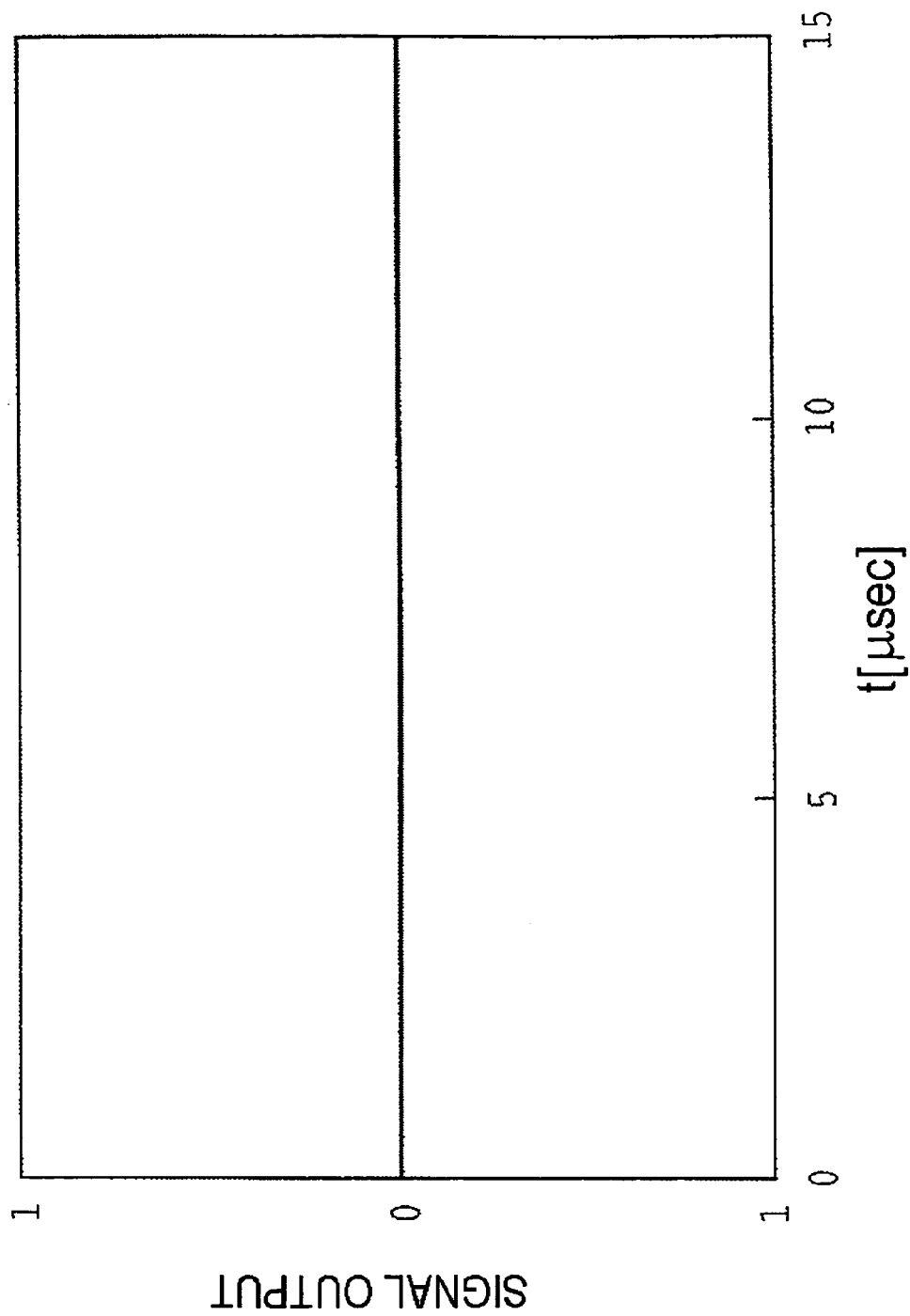
FIG. 13 shows the output waveform after filtering (cutoff frequency $F_c$=10 MHz)

Next, the method of determination of the cutoff frequency for the filter portion 84 is explained. When performing inspections at a constant rate of rotation, the period of output fluctuations due to eccentricity of the radial position of the magnetic head 82 does not change. Hence the output fluctuation period $T_2$ due to eccentricity at an appropriate radial position can be estimated. For example, if the eccentricity is 100 µm p-p, the disk rotation rate is 5400 rpm, the medium is a discrete-track medium with a track width is 30 nm and groove width of 30 nm, and the magnetic head 82 has an element width of 45 nm, then the period of periodic signals due to track traversal is approximately 470 Hz, as shown in FIG. 9. This fluctuation component is removed by the filter portion 84. In order to study the cutoff frequency $F_c$, the cutoff frequency $F_c$ was varied and the output waveform calculated for the waveform shown in FIG. 9. A 200th-order FIR filter was used as the filter.

Figure 14:
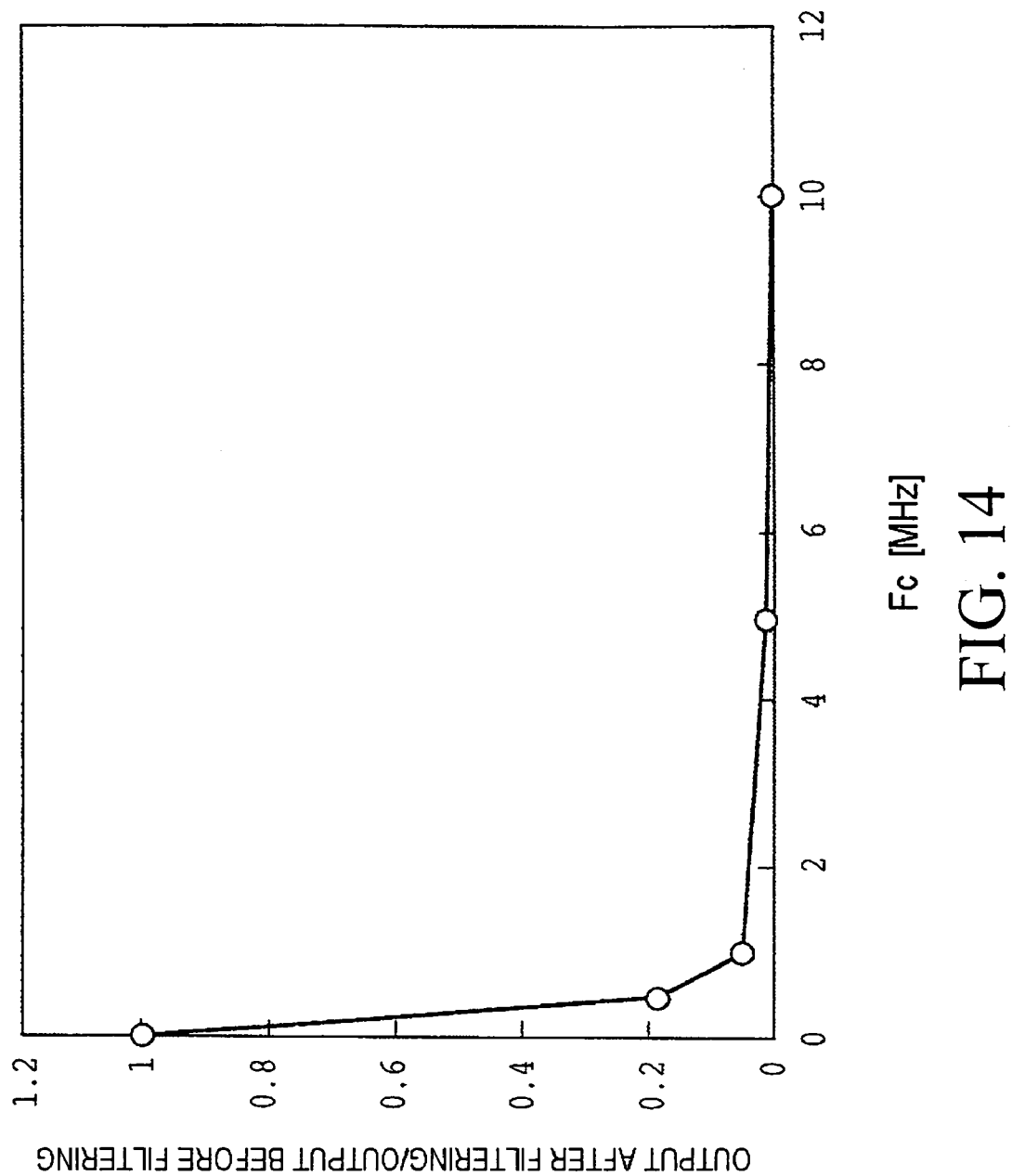
FIG. 14 shows values of (post-filtering output/pre-filtering output) when the cutoff frequency $F_c$ is varied.

FIG. 10 through FIG. 13 show output waveforms after passing through a filter with a cutoff frequency $F_c$ (where $F_c$=0.5 MHz, 1 MHz, 5 MHz, and 10 MHz respectively). FIG. 14 shows values of output-after-filtering/output-before-filtering when the cutoff frequency $F_c$ was varied. From these results, it is seen that fluctuation components can be substantially removed when the cutoff frequency $F_c$ is 1 MHz or higher, and a cutoff frequency $F_c \geqq (1/T_2)*2$ can be the to be satisfactory. In this way, the lower limit to the cutoff frequency $F_c$ can be determined.

Figure 15:
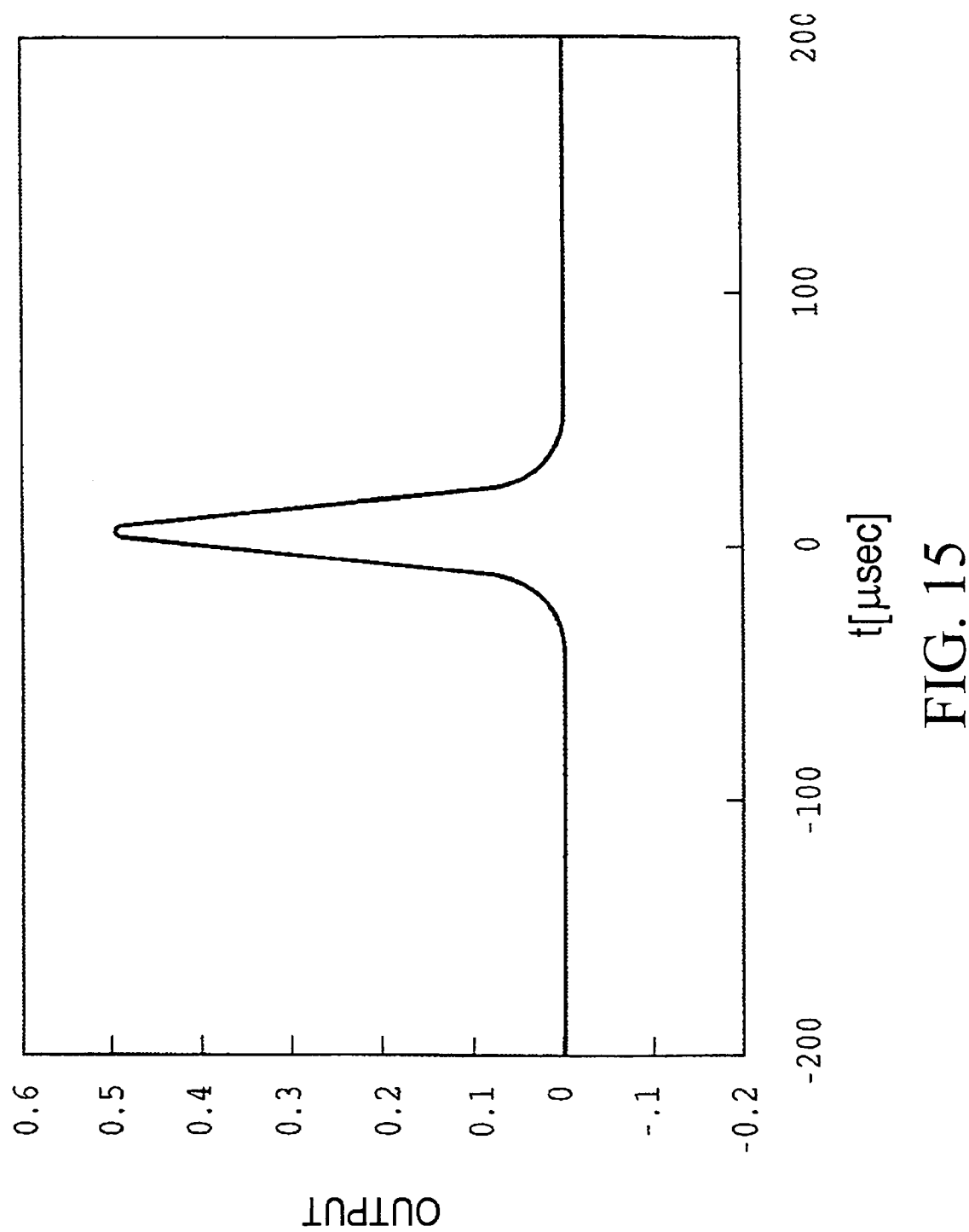
FIG. 15 shows an extra pulse waveform.
Figure 16:
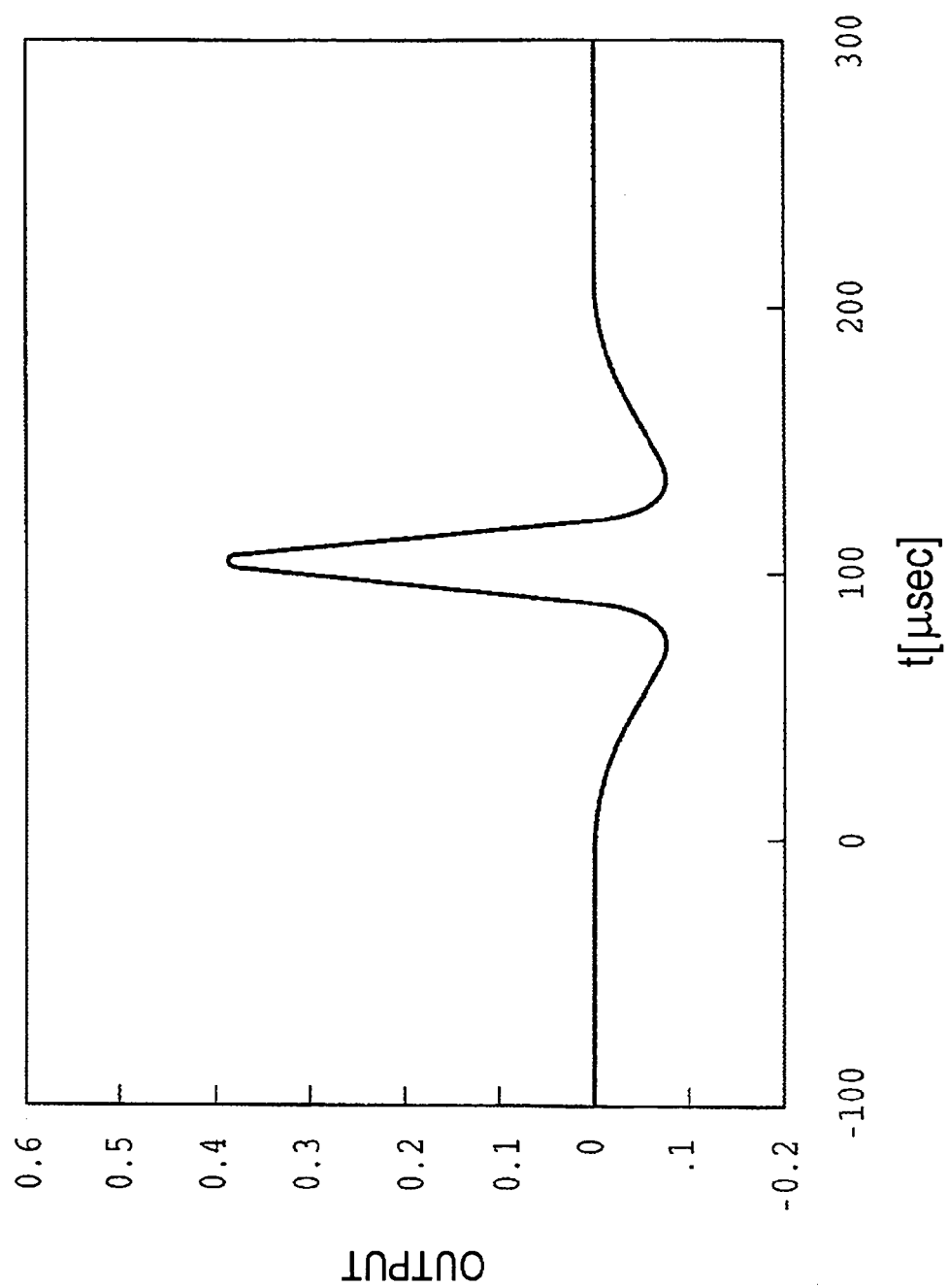
FIG. 16 shows an output waveform after filtering (cutoff frequency $F_c$=5 MHz)
Figure 17:
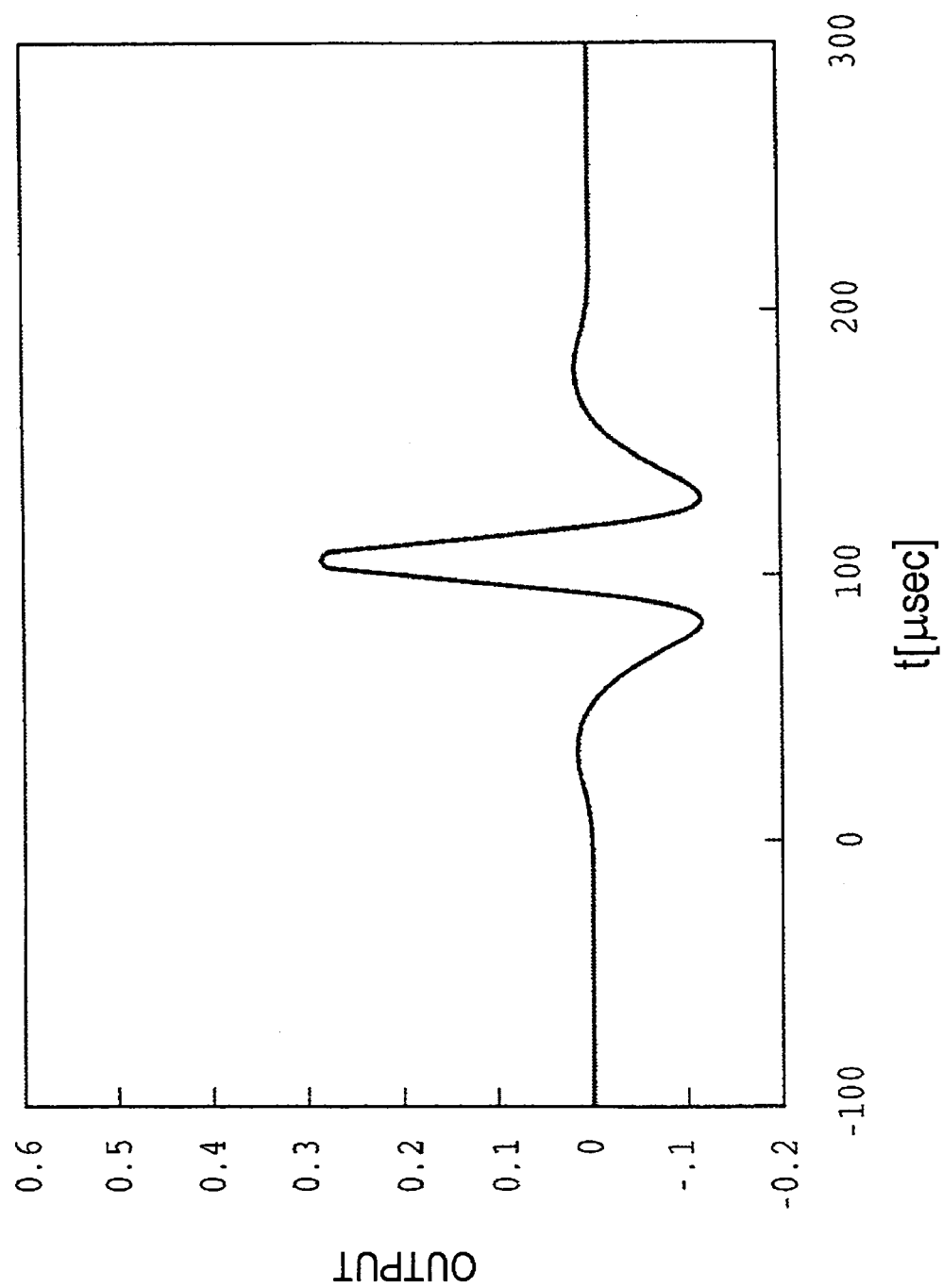
FIG. 17 shows an output waveform after filtering (cutoff frequency $F_c$=10 MHz)
Figure 18:
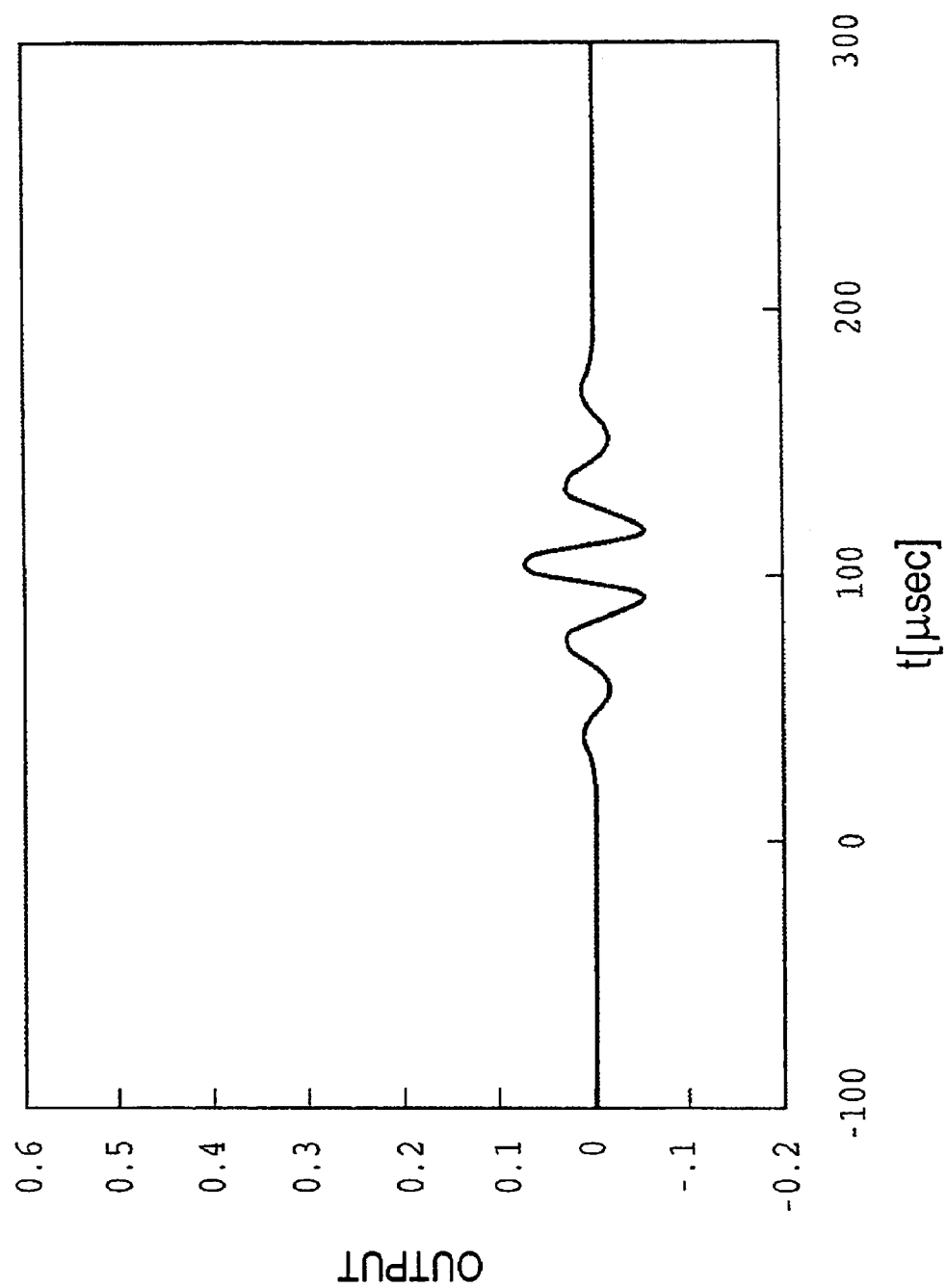
FIG. 18 shows an output waveform after filtering (cutoff frequency $F_c$=22.5 MHz)
Figure 19:
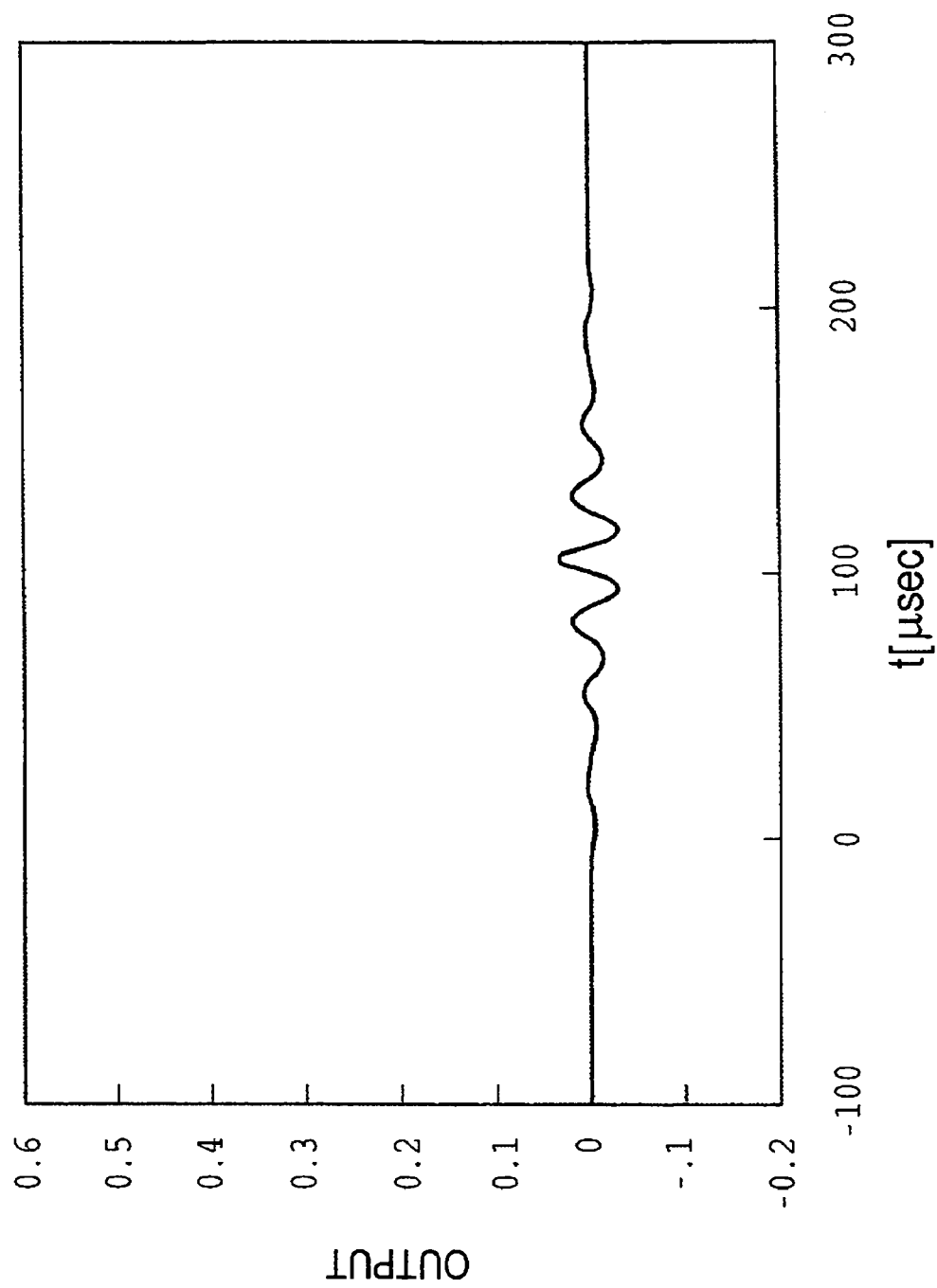
FIG. 19 shows an output waveform after filtering (cutoff frequency $F_c$=35 MHz)
Figure 20:
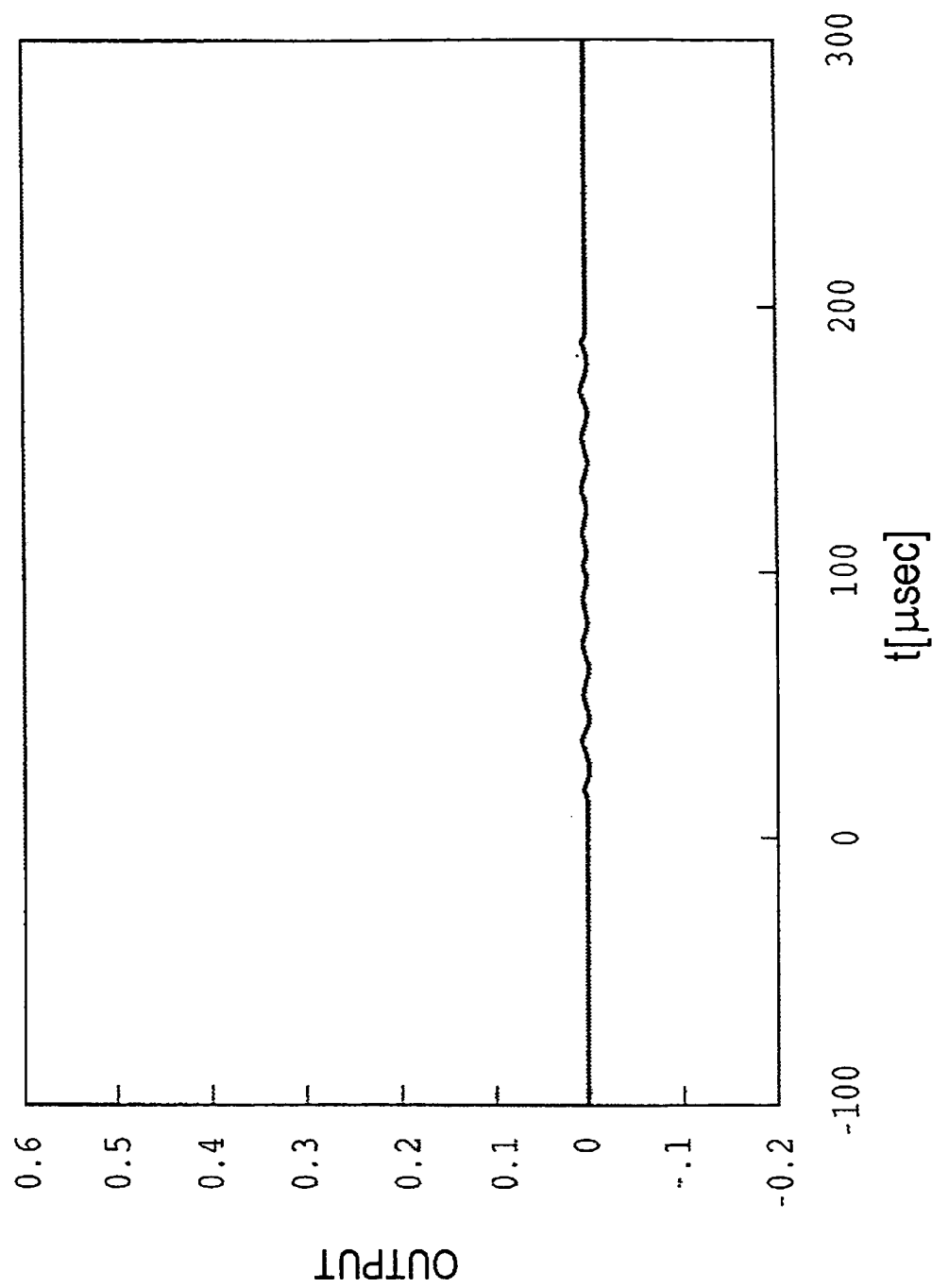
FIG. 20 shows an output waveform after filtering (cutoff frequency $F_c$=55 MHz)
Figure 21:
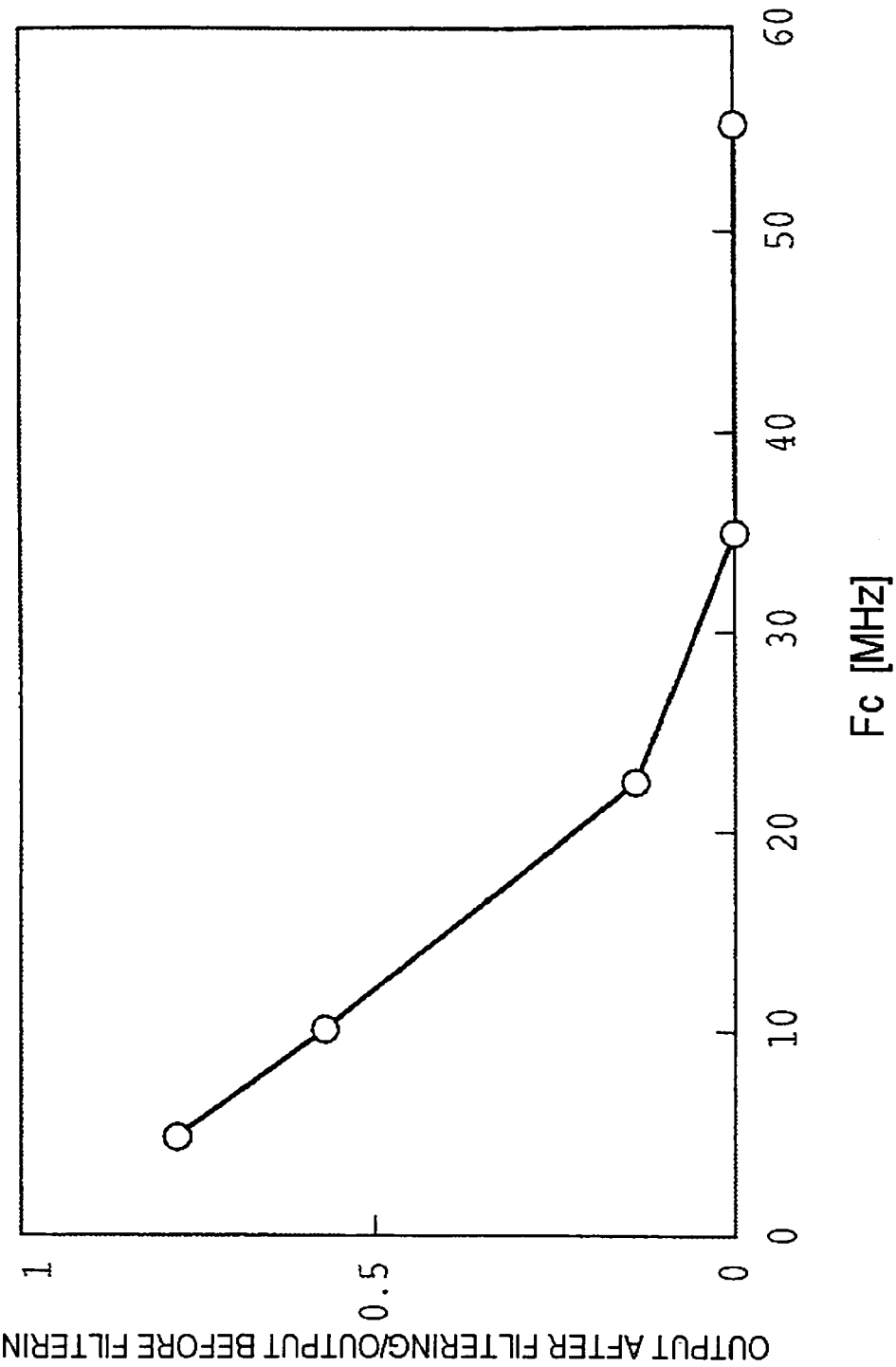
FIG. 21 shows the post-filtering output/pre-filtering output values when the cutoff frequency $F_c$ is varied.

Next, the upper limit to the cutoff frequency $F_c$ is determined. The upper limit to the cutoff frequency $F_c$ is the upper limit of the range over which extra pulses can be detected. In the case of extra pulses, when performing inspections at a constant rotation rate, pulse lengths are longest on the inner circumference of the disk, and so the waveform at the inner circumference is considered as a reference. For example, suppose that the disk size is 2.5", and that the radial position is 12 mm. When $T_{50}$=11.3 nsec and $T_0$=11.3 nsec, the extra pulse waveform is as shown in FIG. 15. And, the rise time $T_c$ calculated using equation (1) above (when the amplitude is 100%, the time required for the output h(t) to change from 10% to 90%) is 22 nsec. FIG. 16 through FIG. 20 show output waveforms after filtering at cutoff frequencies $F_c$ (where $F_c$=5 MHz, 10 MHz, 22.5 MHz, 35 MHz, and 55 MHz, respectively). FIG. 21 shows the value of the output-after-filtering/output-before-filtering when the cutoff frequency $F_c$ was varied. From the results it is seen that when the cutoff frequency $F_c$ is 22.5 MHz or lower, the extra pulse output can be extracted, and that a cutoff frequency of $F_c \leq (1/T_r)/2$ is satisfactory. When actually measuring the rise time $T_r$, it is sufficient to measure the rise time of a reproduced waveform for signals recorded at a low recording density.

From the above, the range of the cutoff frequency $F_c$ of the filter portion 84 can be represented by equation (3) below.

$$\frac{2}{T_2} \leq F_c \leq \frac{1}{2T_r} \qquad (3)$$

Figure 22:
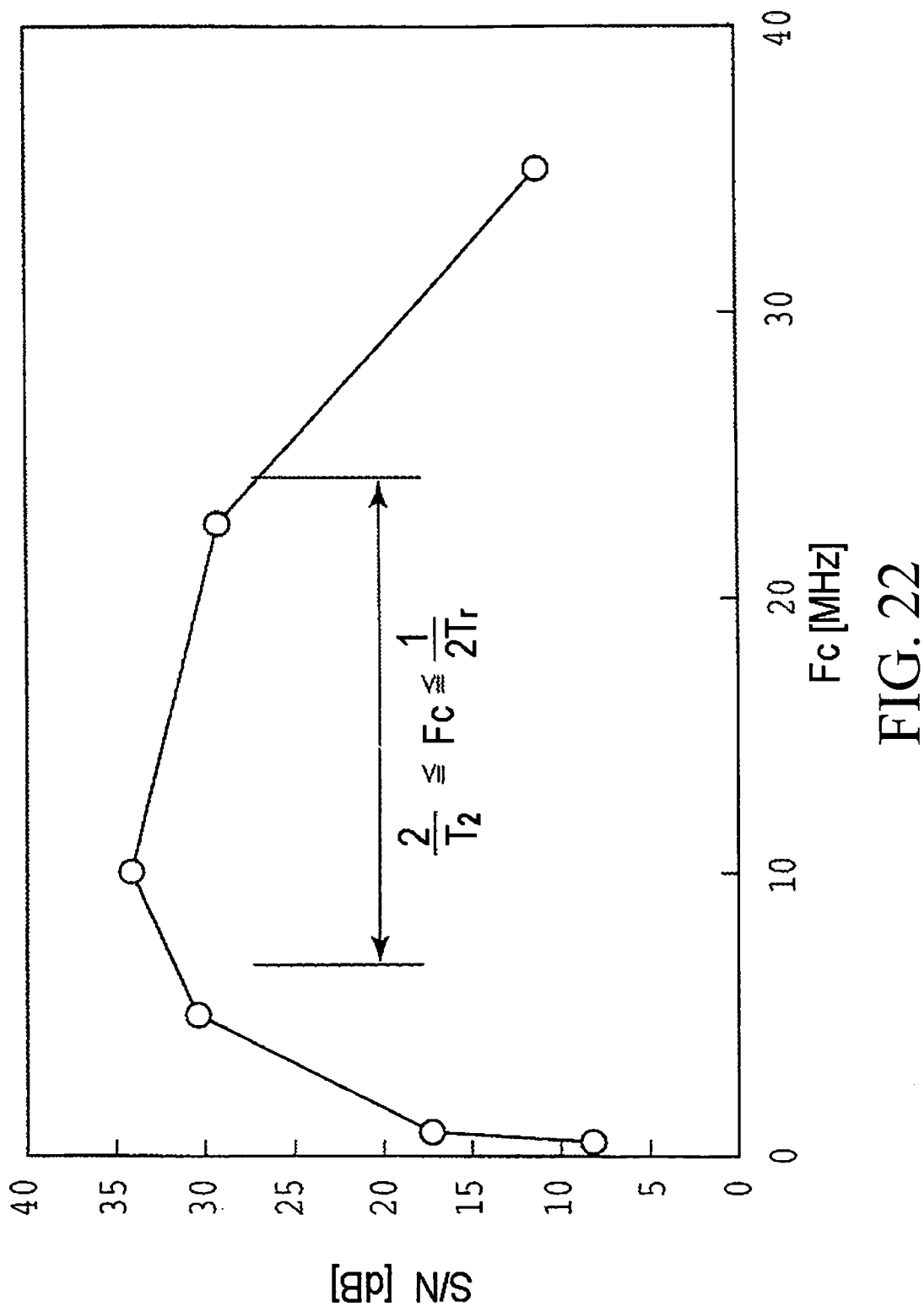
FIG. 22 shows the signal-to-noise ratio (S/N) when the cutoff frequency $F_c$ is varied.

FIG. 22 shows the signal-to-noise ratio (S/N) when the cutoff frequency $F_c$ is varied in this embodiment. Here, the signal output is the value of the extra pulse from level 0 to peak at the various cutoff frequencies $F_c$. The noise level is the value of the head output from the lower-side peak to the upper-side peak when a track is traversed. The figure shows that an adequate S/N can be obtained if the range of cutoff frequencies $F_c$ stipulated by the above equation (3) is used.

Therefore, by using a filter with a cutoff frequency as indicated by the above equation (3), certification characteristic inspections (that is, defect inspections) of a discrete track type perpendicular magnetic recording medium can be performed without applying a servomechanism.

Second Embodiment

Similarly to the above-described embodiment, in this embodiment, a DC magnetization of the medium is first performed, the magnetization direction of pattern portions is made uniform, and servo signal reproduction by a magnetic head is made possible. This is because in a patterned medium for perpendicular recording immediately after completion of manufacturing processes, the magnetization is in various directions in the pattern portions, and reproduced signals corresponding to servo data cannot be obtained by a magnetic head.

Figure 23:
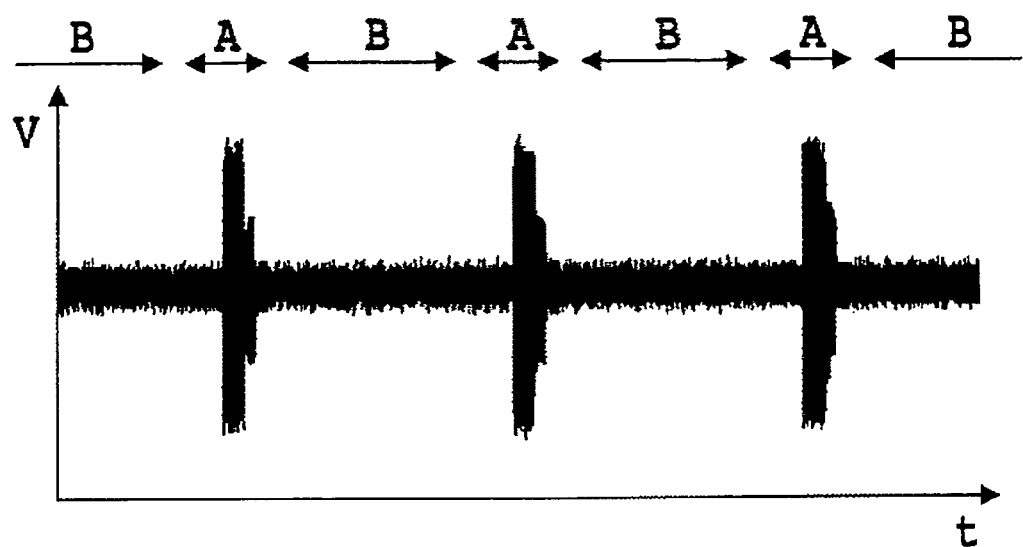
FIG. 23 shows a servo signal.
Figure 24:
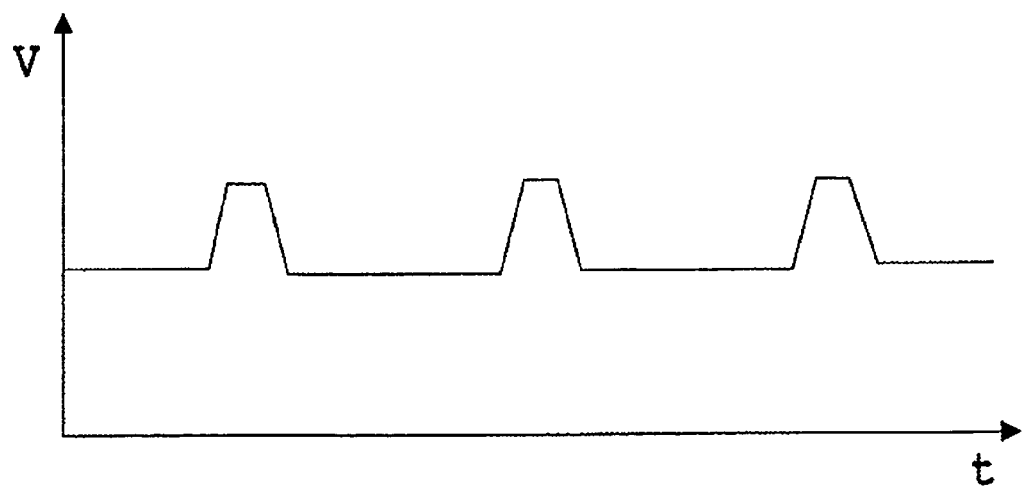
FIG. 24 shows the servo signal envelope obtained by performing envelope detection of a servo signal.
Figure 25:
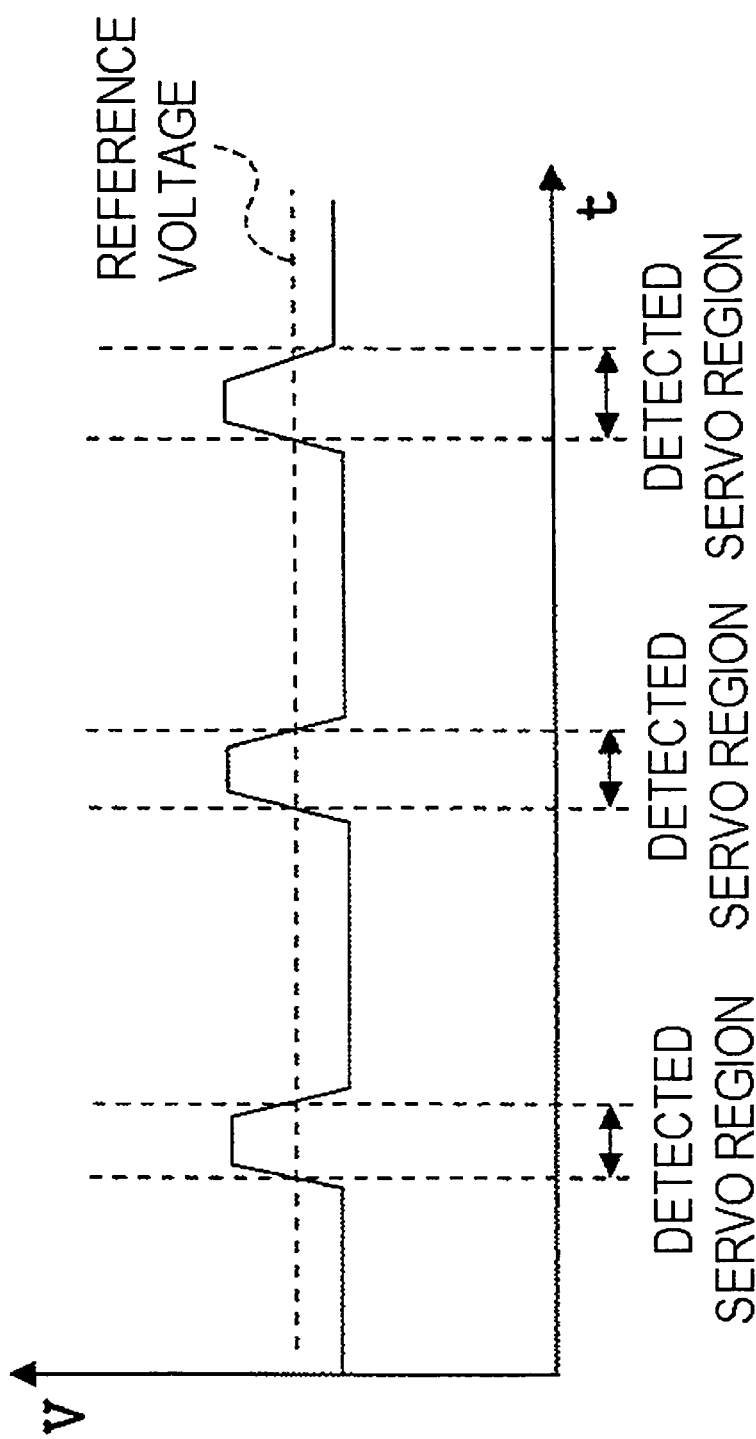
FIG. 25 compares the servo signal envelope and a reference voltage.

Servo signals are observed as shown in FIG. 23. In the figure, the A regions are servo regions, and the B regions are data regions. To detect servo regions, envelope detection of reproduced signals is first performed, and the reproduced signal envelope (see FIG. 24) is obtained. Next, the obtained signal is compared with a reference voltage, and a region in which the obtained signal is at a higher level than the reference voltage is detected as a servo region (see FIG. 25).

On the other hand, the frequency of servo signals is generally several tens of megahertz or higher, considerably higher than the frequency of signals generated by track deviation. Hence, in the detections of signal envelopes and servo regions, signals due to track deviation and servo signals can be separated by providing a high-pass filter before the envelope detection circuit. Hence, even if there are grooves between tracks in data regions, servo regions can be detected by performing envelope detection.

Figure 26:
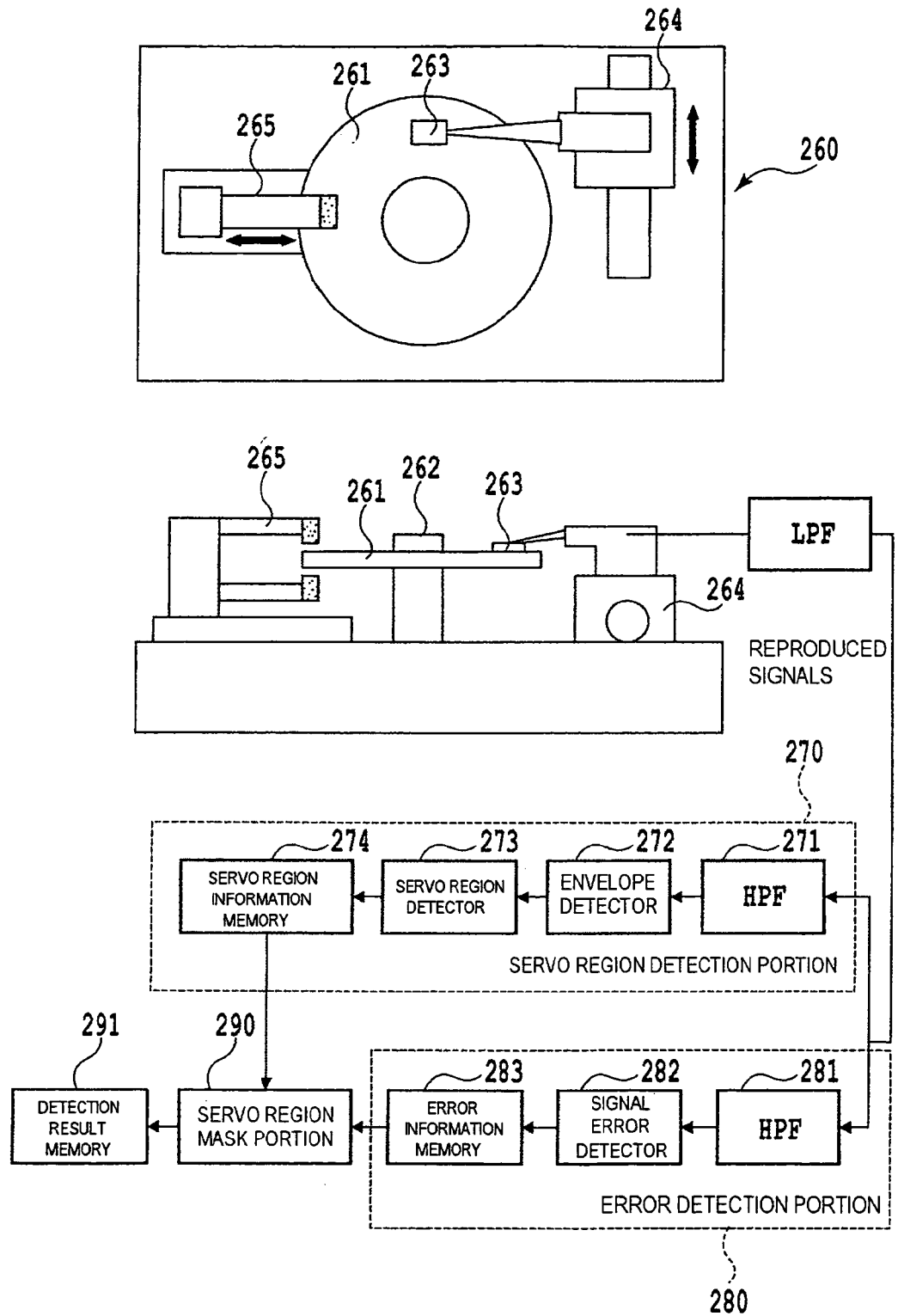
FIG. 26 shows the patterned medium defect inspection device of an aspect of the invention.

FIG. 26 illustrates an exemplar configuration of a patterned medium defect inspection device 260 of this embodiment. The defect inspection device 260 includes a spindle portion 262 that rotates the disk 261 for inspection, a stage portion 264 that holds and moves the inspection head 263, a magnet portion 265 that performs DC magnetization of the disk 261, a servo region detection portion 270 that detects servo regions from reproduced signals, an error detection portion 280 that detects error information from reproduced signals, a servo region mask portion 290 that masks servo regions detected by the servo region detection portion 270 among the error information detected by the error detection portion 280 and obtains error detection results, and, a detection result memory 291 that holds detection results.

The servo region detection portion 270 includes a high-pass filter (HPF) 271 to separate output due to track deviation and servo signals, an envelope detector 272, a servo region detector 273 that detects servo regions from envelopes obtained by the envelope detector 272, and a servo region information memory 274, which temporarily holds servo region information obtained by the servo region detector 273.

Figure 27:
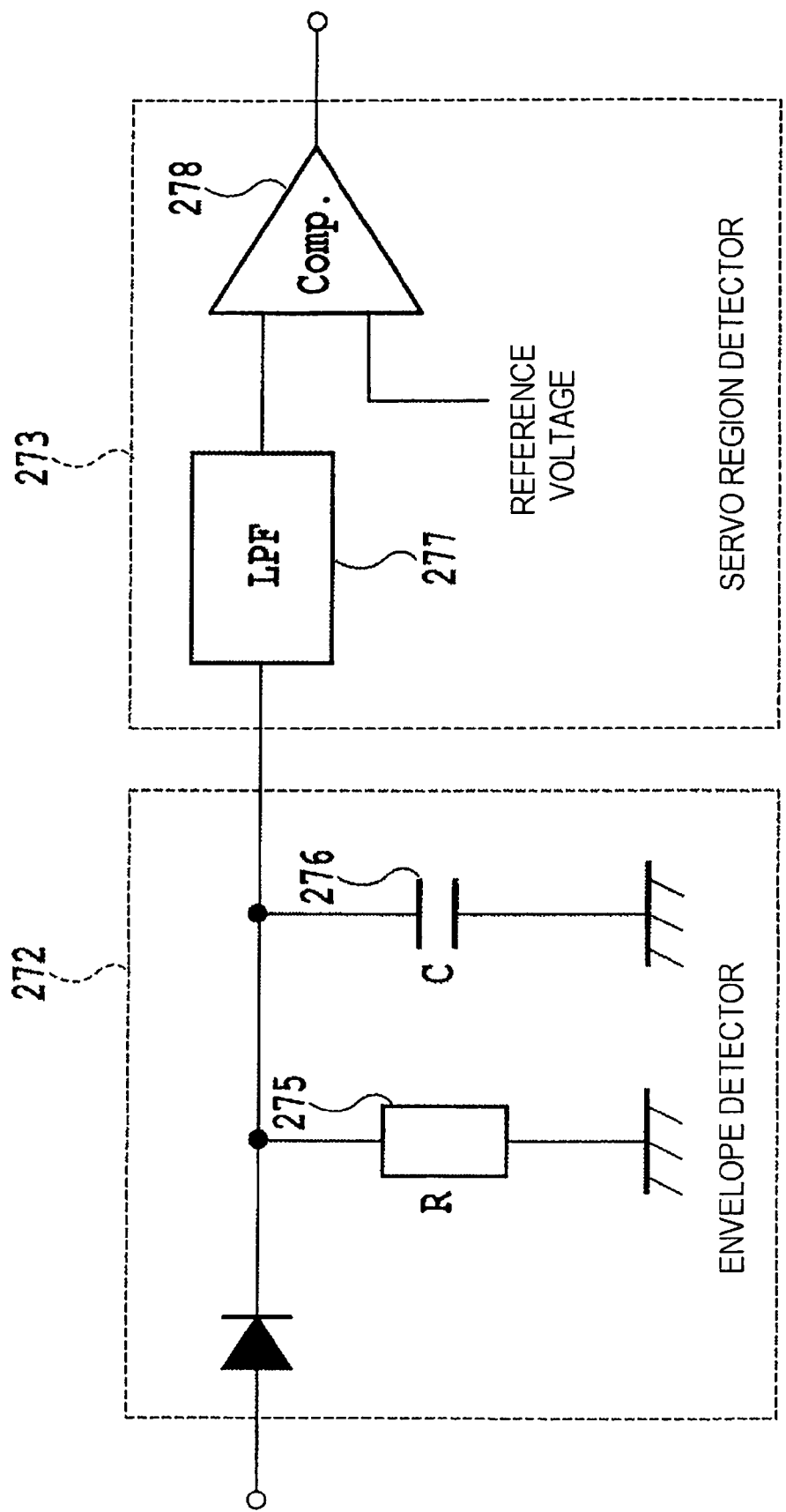
FIG. 27 shows in more detail the envelope detector and servo region detector of the defect inspection device of an aspect of the invention.

FIG. 27 shows in greater detail the envelope detector 272 and the servo region detector 273.

The envelope detector 272 includes, after diode detection, a time constant circuit combining a resistance 275 and a capacitor 276. By matching this time constant to the servo signal period, the envelope of the servo signal can be extracted. For example, if the servo signal is of frequency 50 MHz, then the period is equal to a time constant of $\tau=0.02\mu$.

The servo region detector 273 detects servo regions from the servo signal envelopes extracted by the envelope detector 272. First, a signal obtained by the envelope detector 272 is input to a low-pass filter (LPF) 277. The signal obtained by the envelope detector 272 comprises an extra pulse output due to a defect. This extra pulse must be separated from the servo signal envelope. Considering the frequencies of the extra pulse and of the servo signal envelope, the extra pulse has a high frequency of order several tens of megahertz, while the servo signal envelope has a low frequency of approximately 100 kHz to 400 kHz. Hence a cutoff frequency for the low-pass filter 277 of approximately 1 MHz is adequate. The output from the low-pass filter 277 is input to a comparator 278 and compared with a reference voltage. When the servo signal envelope is detected, a high output is obtained. For other than a servo region, a low output is obtained.

Hence, the servo region detection portion 270 performs envelope detection of reproduced signals output from the DC-magnetized disk 261, and detects servo regions and other pre-format regions.

The error detection portion 280 includes a high-pass filter (HPF) 281 that extracts only the extra pulse component from the reproduced signal, a signal error detector 282 that performs defect inspection using the signal which has passed through the filter 281, and an error information memory 283 that temporarily stores the result of the signal error detector 282.

Defect inspections using the defect inspection device of this embodiment are performed according to the following procedure.

Figure 28A:
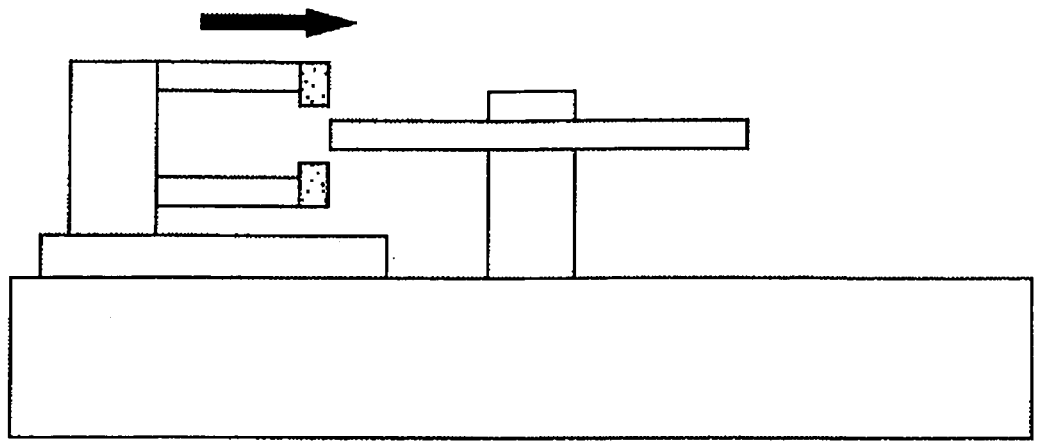
FIGS. 28A and 28B show operation of the magnet portion of the defect inspection device of an aspect of the invention; and, FIG. 29 shows the structure of the tip portion of the magnet portion of the defect inspection device of an aspect of the invention.
Figure 28B:
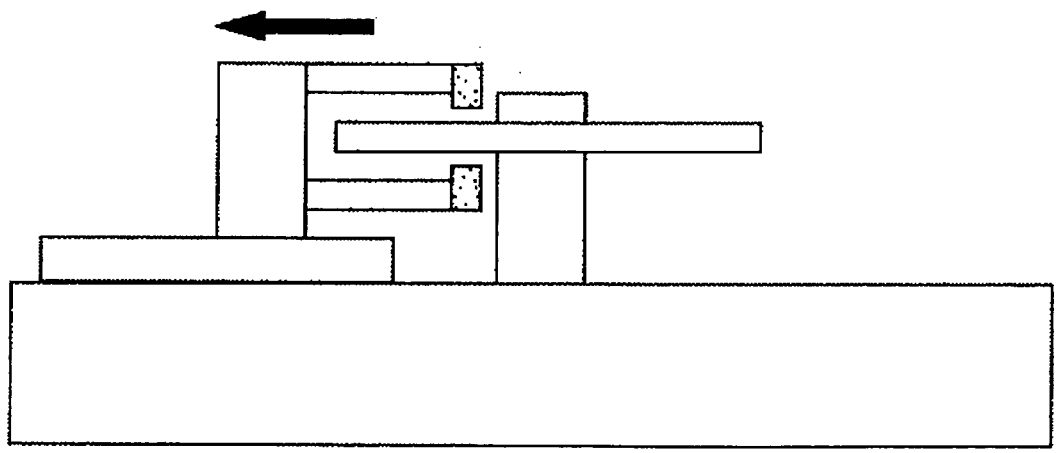
Figure 29:
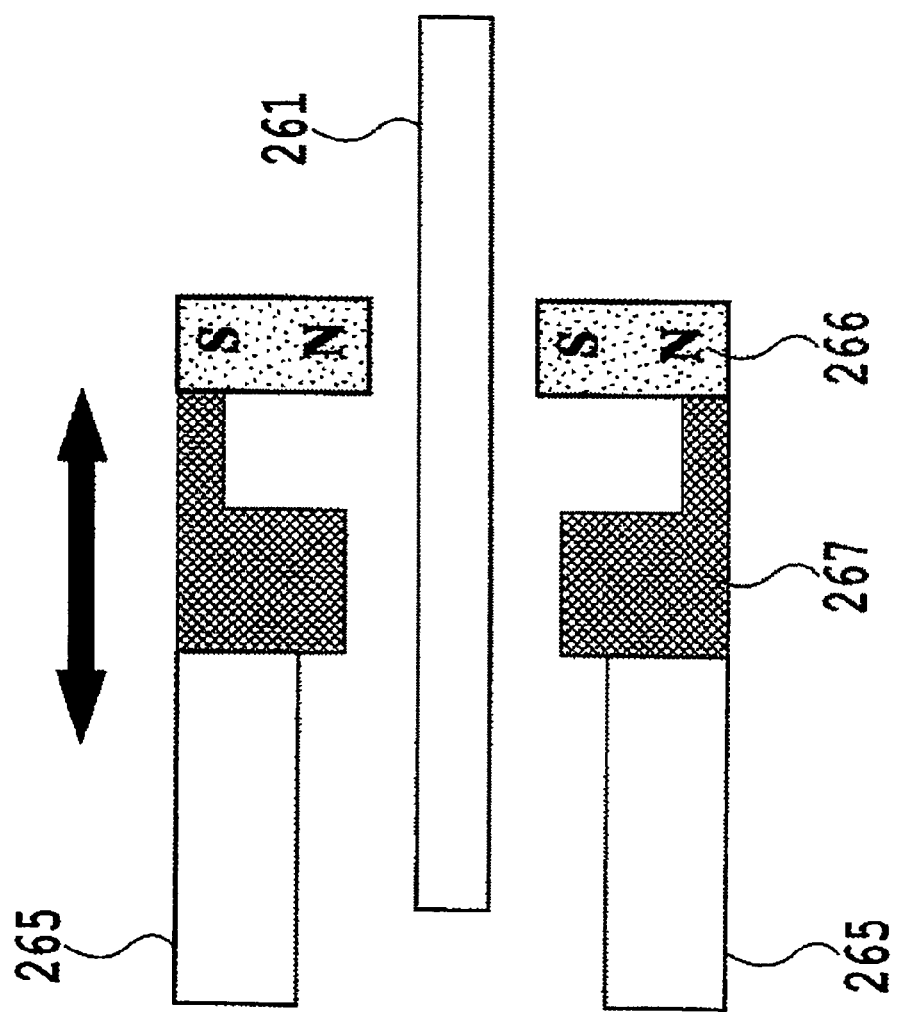

First, the disk 261 for inspection is placed on the spindle portion 262, and the spindle is rotated at a prescribed rotation rate. With the spindle being rotated, the magnet portion 265 is moved from the disk outer circumference toward the inner circumference (see FIG. 28A). After the magnets have reached the vicinity of the inner circumference of the disk, the magnets are then moved from the disk inner-circumference side toward the outer-circumference side (see FIG. 28B). Therefore, DC magnetization of the patterned medium for inspection (that is, the disk 261) is performed. Here, the structure of the tip portion of the magnet portion 265 is as shown in FIG. 29, arranged such that the N pole and S pole of the magnets 266 are opposed above and below so as to enclose the disk 261. A return yoke 267 is provided for each magnet 266.

Next, the stage portion 264 is moved, and after moving the inspection head 263 to a prescribed loading position, the inspection head 263 is loaded onto the disk 261. Then, the inspection head 263 is moved to the starting radial position for inspection, and reproduced signals at that position are obtained. The reproduced signals obtained are input to the error detection portion 280 and servo region detection portion 270 for processing.

In the error detection portion 280, reproduced signals which have passed through the high-pass filter 281 are compared with a reference signal. When output exceeding the reference signal is detected, it is judged that an extra pulse exists, and the fact of detection of an error is stored in the error information memory 283. At this time, the servo signal in the servo region is regarded as a defect. One circumference of the disk is divided by 4096, and whether an error has been detected at each of the positions is stored in memory 283.

In the servo region detection portion 270, first reproduced signals are input to the high-pass filter 271, and output fluctuation components due to track deviations are removed. Next, the signal is input to the envelope detector 272, and the envelope is output. The output envelope is input to the servo region detector 273 and is compared with a reference voltage. When the envelope is at a higher level than the reference voltage, the region is detected as a servo region. The result of servo region detection is stored in the servo region information memory 274. As with the above-described error detection, one circumference of the disk is divided by 4096, and whether the respective positions are servo regions is stored in memory 274.

The respective above-described detection results are finally consolidated in the servo region mask portion 290. For example, if in the detection results of the servo region detection portion 270 servo regions correspond to "0" and data regions correspond to "1", and if in the detection results of the error detection portion 280 error locations correspond to "1" and error-free locations correspond to "0", then in the servo region mask portion 290, by taking the logical product of the two search results, data region errors can be detected. That is, the detected pre-format regions are masked, and defect locations in data regions can be detected.

When defect inspection is completed, the inspection results are stored in detection result memory, and the inspection head 263 is then moved by a prescribed inspection pitch amount. At the next inspection radial position, similar processing is again performed.

The above operation is continued until the ending radial position for inspection is reached. After reaching the ending radial position for inspection, the inspection head 263 is moved to an unloading position, head unloading is performed, the spindle rotation is halted, and the inspection ends.

By this means, in patterned medium certification inspections, servo regions can be detected without employing a servo demodulator, and servo regions can be masked to perform defect inspections. As a result, even when servo patterns differ among products, the same device can be used to perform inspections.

As explained above, by means of this invention, defect inspections of a patterned medium can be performed without servo control.

What is claimed is:

1. A defect inspection method for a perpendicular magnetic recording medium, the perpendicular magnetic recording medium having discrete recording tracks and grooves between recording tracks, comprising:
   DC demagnetizing the perpendicular magnetic recording medium;
   detecting a reproduced signal from the perpendicular magnetic recording medium after the DC demagnetizing;
   removing output fluctuation components caused by the grooves from the reproduced signal using a filter with a prescribed cutoff frequency, and separating a peak output of the reproduced signal; and
   comparing the peak output with a prescribed reference signal, and identifying as a defect location a location where the peak output exceeds the reference signal.

2. The defect inspection method of claim 1, wherein the prescribed cutoff frequency $F_c$ satisfies a relation $F_c \leq (1/T_r)/2$, $T_r$ being a rise time of the reproduced signal for a magnetic head and the perpendicular magnetic recording medium used in the defect inspection.

3. The defect inspection method of claim 1, wherein the prescribed cutoff frequency $F_c$ satisfies a relation $F_c \geq (1/T_2)*2$, $T_2$ being a period when a magnetic head traverses the recording tracks due to eccentricity.

4. The defect inspection method of claim 1, wherein the DC demagnetizing includes one of DC demagnetizing the entire disk surface of the perpendicular magnetic recording medium in a single operation using a permanent magnet or an electromagnet, and DC demagnetizing an inspection track of the perpendicular magnetic recording medium using a magnetic head.

5. The defect inspection method of claim 4, wherein the prescribed cutoff frequency $F_c$ satisfies a relation $F_c \leq (1/T_r)/2$, $T_r$ being a rise time of the reproduced signal for a magnetic head and the perpendicular magnetic recording medium used in the defect inspection.

6. The defect inspection method of claim 4, wherein the prescribed cutoff frequency $F_c$ satisfies a relation $F_c \geq (1/T_2)*2$, $T_2$ being a period when a magnetic head traverses the recording tracks due to eccentricity.

7. The defect inspection method of claim 1, further comprising:
   performing an envelope detection on the reproduced signal; and
   detecting a pre-format region in the perpendicular magnetic recording medium using the result of the envelope detection.

8. The defect inspection method of claim 7, further comprising:
   masking the detected pre-format region; and
   detecting the defect location in a region outside the masked pre-format region in the perpendicular magnetic recording medium.

9. A defect inspection device for inspecting a perpendicular magnetic recording medium, the perpendicular magnetic recording medium having discrete recording tracks and grooves between recording tracks, comprising:
   means for DC demagnetizing the perpendicular magnetic recording medium;
   means for detecting a reproduced signal from the perpendicular magnetic recording medium after the DC demagnetizing;
   means for removing output fluctuation components caused by the grooves from the reproduced signal using a filter with a prescribed cutoff frequency, and for separating a peak output of the reproduced signal; and
   means for comparing the peak output with a prescribed reference signal, and for identifying a location where the peak output exceeds the reference signal as a defect location.

10. The defect inspection device of claim 9, wherein the prescribed cutoff frequency $F_c$ satisfies a relation $F_c \leq (1/T_r)/2$, $T_r$ being a rise time of the reproduced signal for a magnetic head and the perpendicular magnetic recording medium used in the defect inspection.

11. The defect inspection device of claim 9, wherein the cutoff frequency $F_c \geq (1/T_2)*2$, $T_2$ being a period when a magnetic head traverses the recording tracks due to eccentricity.

12. The defect inspection device of claim 9, wherein the DC demagnetizing includes one of DC demagnetizing the entire disk surface of the perpendicular magnetic recording medium in a single operation using a permanent magnet or an electromagnet, and DC demagnetizing an inspection track of the perpendicular magnetic recording medium using a magnetic head.

13. The defect inspection device of claim 12, wherein the prescribed cutoff frequency $F_c$ satisfies a relation $F_c \leq (1/T_r)/2$, $T_r$ being a rise time of the reproduced signal for a magnetic head and the perpendicular magnetic recording medium used in the defect inspection.

14. The defect inspection device of claim 12, wherein the prescribed cutoff frequency $F_c$ satisfies a relation $F_c \geq (1/T_2)*2$, $T_2$ being a period when a magnetic head traverses the recording tracks due to eccentricity.

15. The defect inspection device of claim 9, further comprising:
   means for performing an envelope detection on the reproduced signal; and
   means for detecting a pre-format region in the perpendicular magnetic recording medium using the result of the envelope detection.

16. The defect inspection device of claim 15, further comprising:
   means for masking the detected pre-format region; and
   means for detecting the defect location in a region outside the masked pre-format region in the perpendicular magnetic recording medium.

* * * * *